(12) United States Patent
Huang

(10) Patent No.: US 6,192,758 B1
(45) Date of Patent: Feb. 27, 2001

(54) STRUCTURE SAFETY INSPECTION

(76) Inventor: Kang Huang, 13F, 222 Wen-Lin N. Rd., Taipei (TW)

( * ) Notice: Subject to any disclaimer, the term of this patent is extended or adjusted under 35 U.S.C. 154(b) by 0 days.

(21) Appl. No.: 09/210,693

(22) Filed: Dec. 14, 1998

(51) Int. Cl.[7] .................................................. G01M 7/00
(52) U.S. Cl. ................................................. 73/579; 73/594
(58) Field of Search ............................ 73/570, 577, 579, 73/584, 587, 594; 702/34, 35, 36

(56) References Cited

U.S. PATENT DOCUMENTS

| 4,901,575 | * | 2/1990 | Bohannan et al. ...................... 73/587 |
| 4,956,999 | * | 9/1990 | Bohannan et al. ...................... 73/587 |
| 5,327,358 | * | 7/1994 | Stubbs .................................... 702/36 |
| 5,335,184 | * | 8/1994 | Hildebrand ............................. 702/34 |

* cited by examiner

Primary Examiner—Richard A. Moller
(74) Attorney, Agent, or Firm—William W. Haefliger

(57) ABSTRACT

In the method of determining the location of structure damage to a bridge structure, the steps that include providing a transient load imposing device; traveling the device onto the bridge and then along the bridge, detecting bridge vibrating response including changes in frequency during traveling, and determining the position of the device in relation to a shift of frequency below a selected value.

8 Claims, 32 Drawing Sheets

ORIGINAL BRIDGE PARAMETERS:

|  | ED | DC | CB |
|---|---|---|---|
| CROSS SECTION AREA | 11.29 | 10.10 | 8.38 $M^2$ |
| MOMENT OF INERTIA | 12.02 | 10.88 | 8.59 $M^4$ |

TEST BRIDGE CONDITIONS FOR SECTION AB:

|  | CASE 1 (UNDAMAGED) | CASE 2 (DAMAGED) |
|---|---|---|
| CROSS SECTION AREA | 8.38 | 4.18 $M^2$ |
| MOMENT OF INERTIA | 8.59 | 4.29 $M^4$ |

VEHICLE VELOCITY: 33 m/s

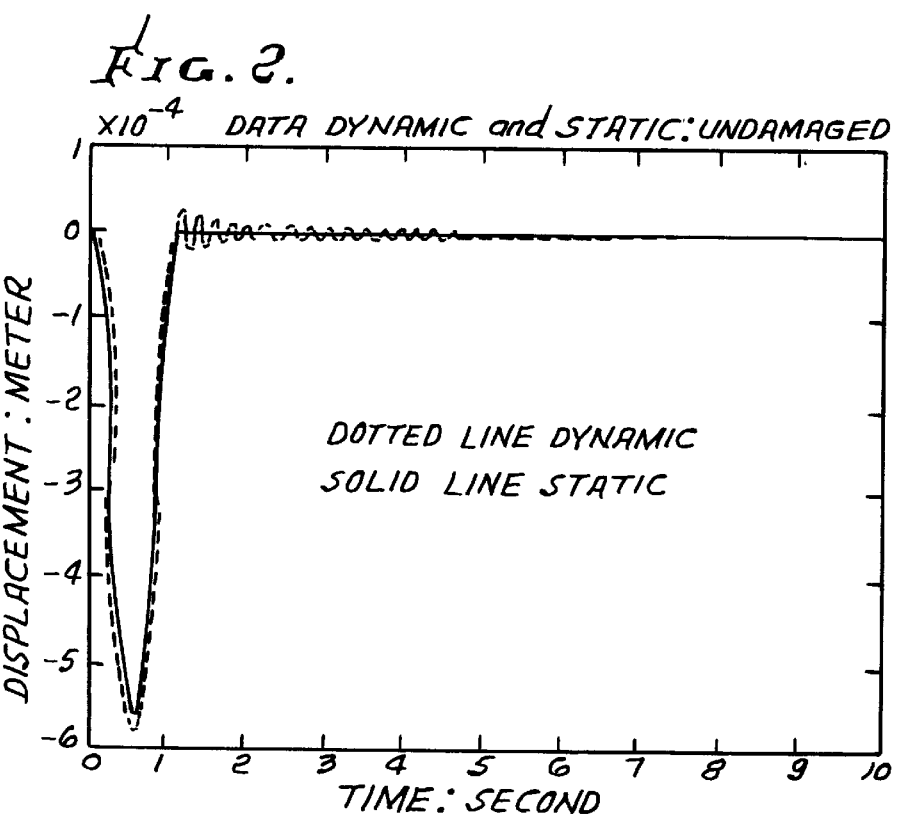
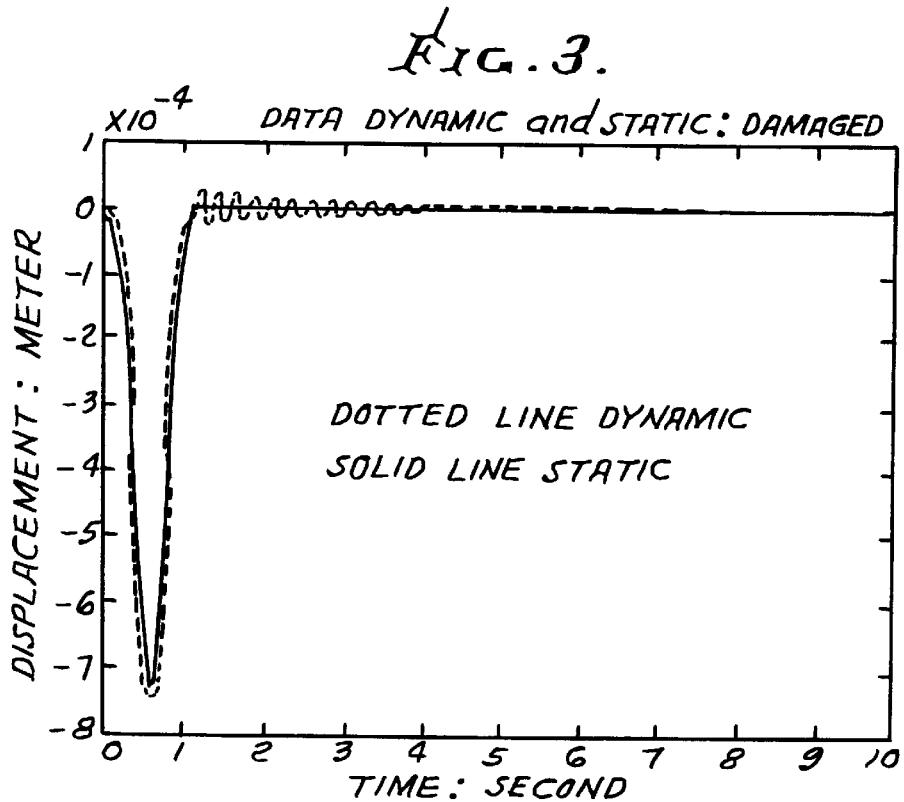

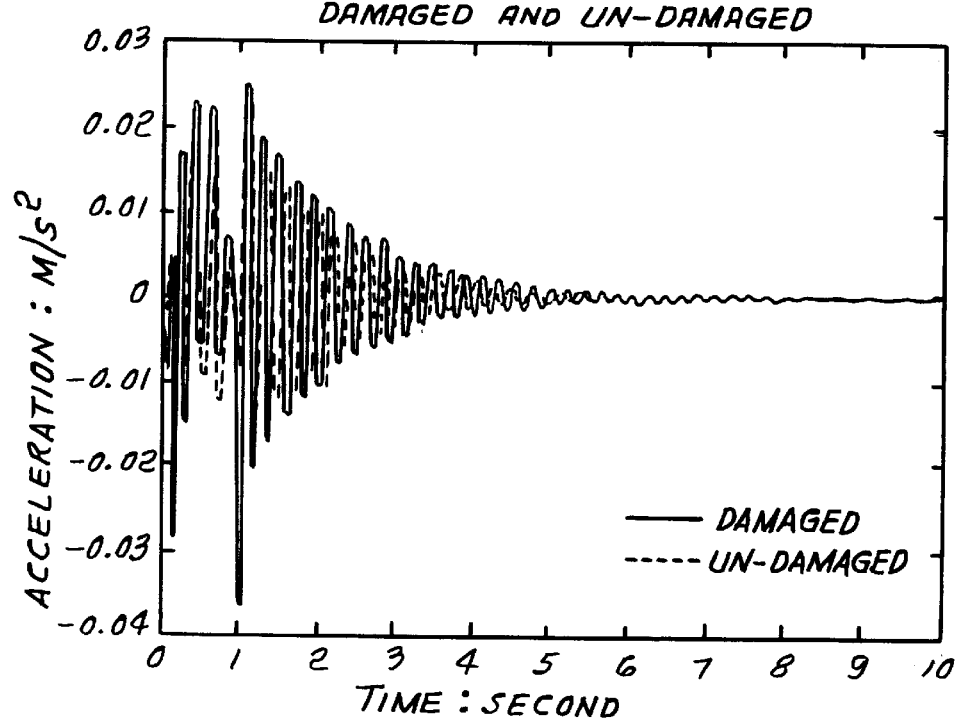
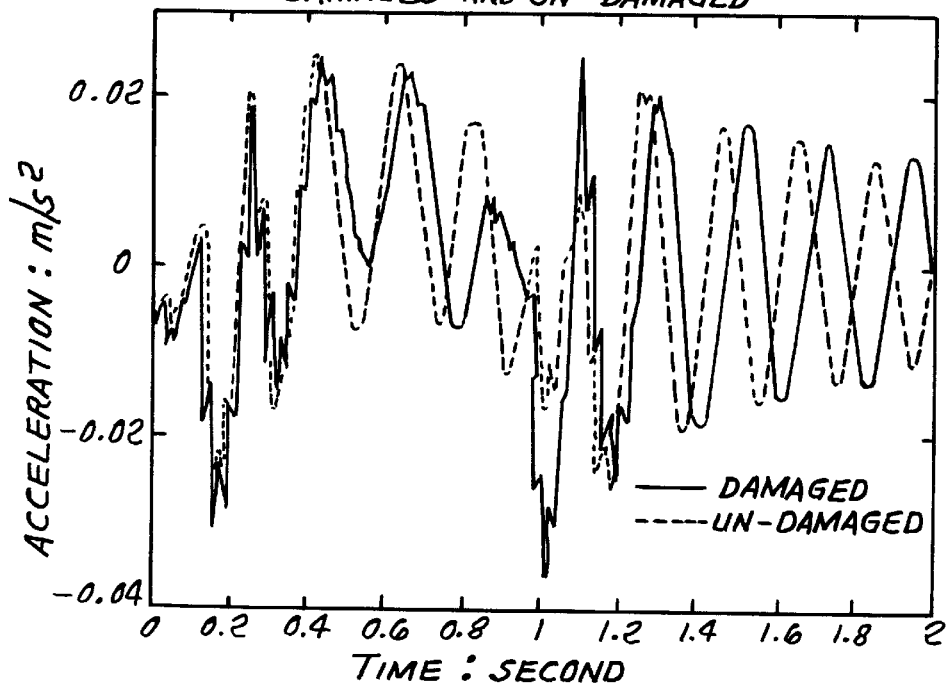

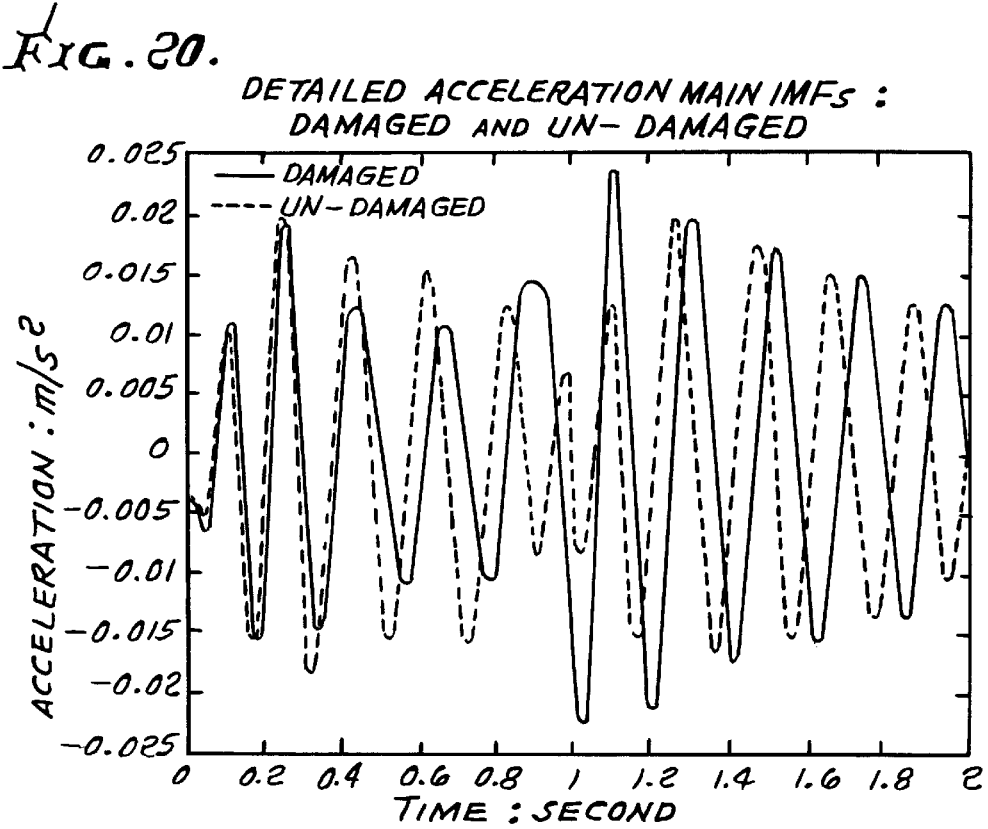
FIG. 20. DETAILED ACCELERATION MAIN IMFs: DAMAGED AND UN-DAMAGED
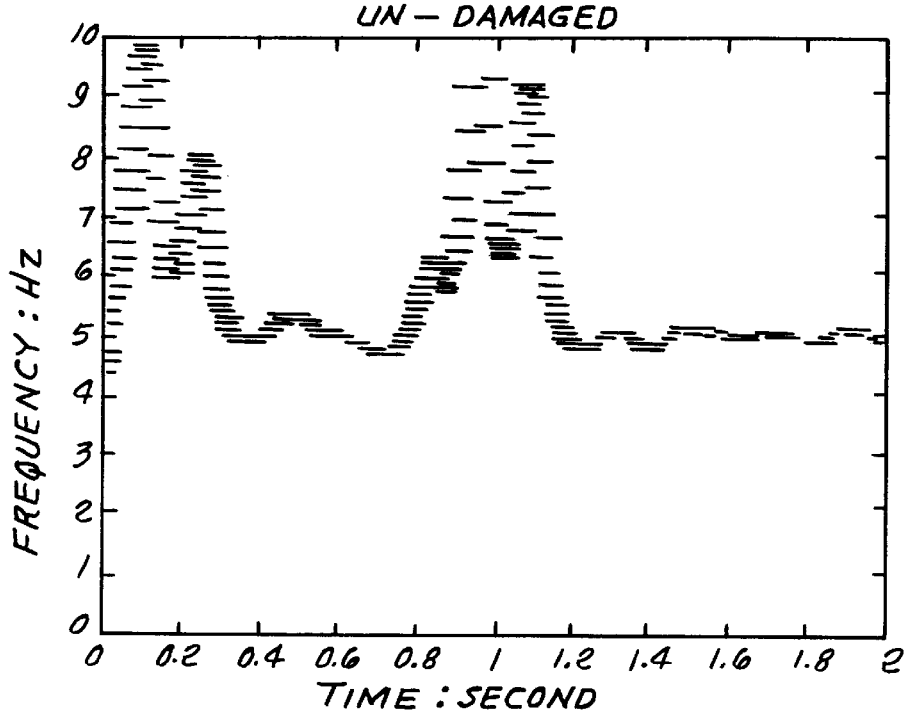
FIG. 21. DETAILED HILBERT SPECTRUM LOG: UN-DAMAGED

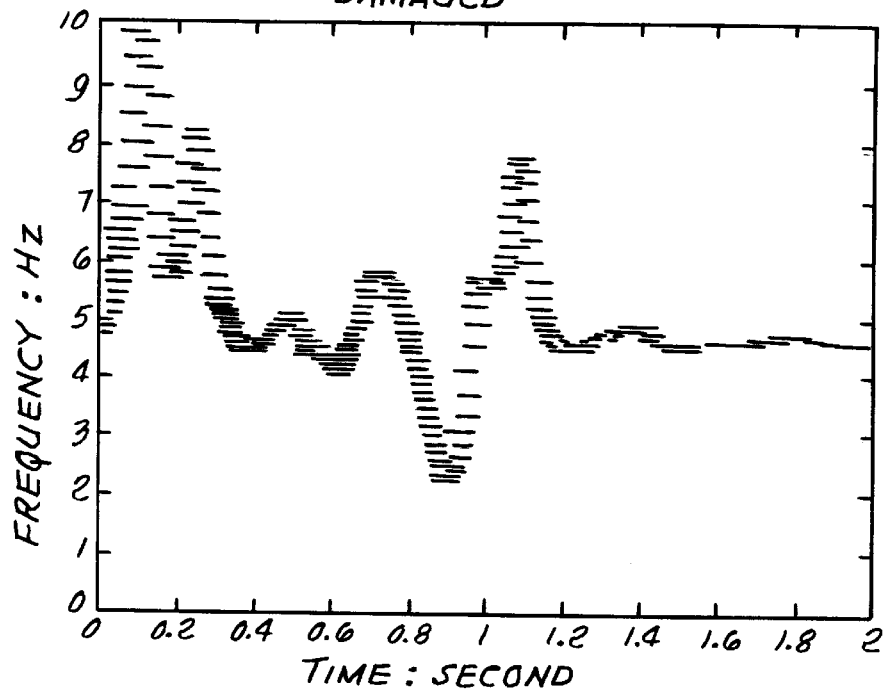
FIG. 22. DETAILED HILBERT SPECTRUM LOG: DAMAGED
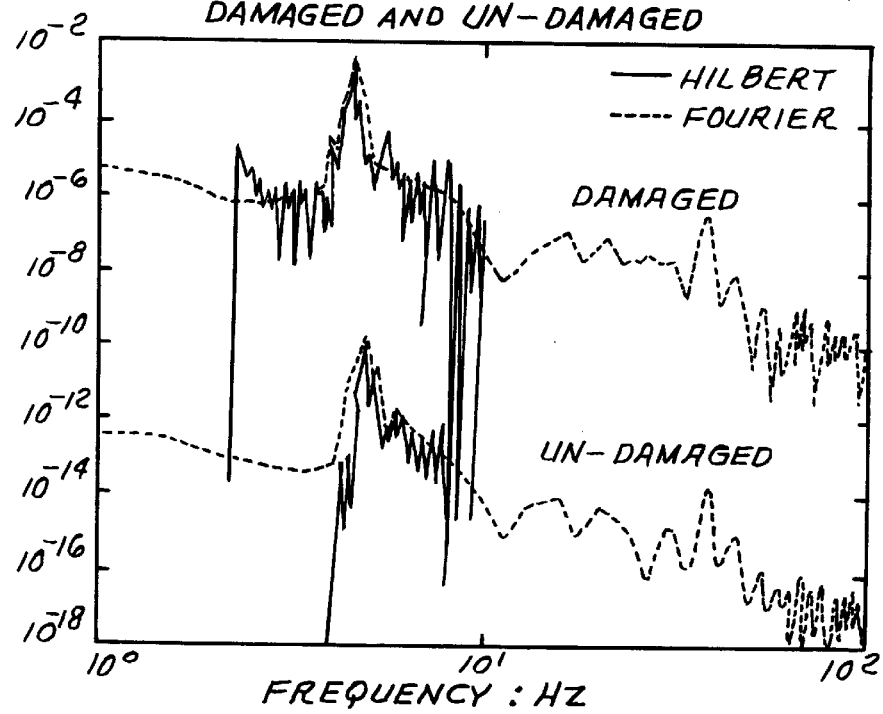
FIG. 23. MATGINAL HILBERT AND FOURIER SPECTRA DAMAGED AND UN-DAMAGED

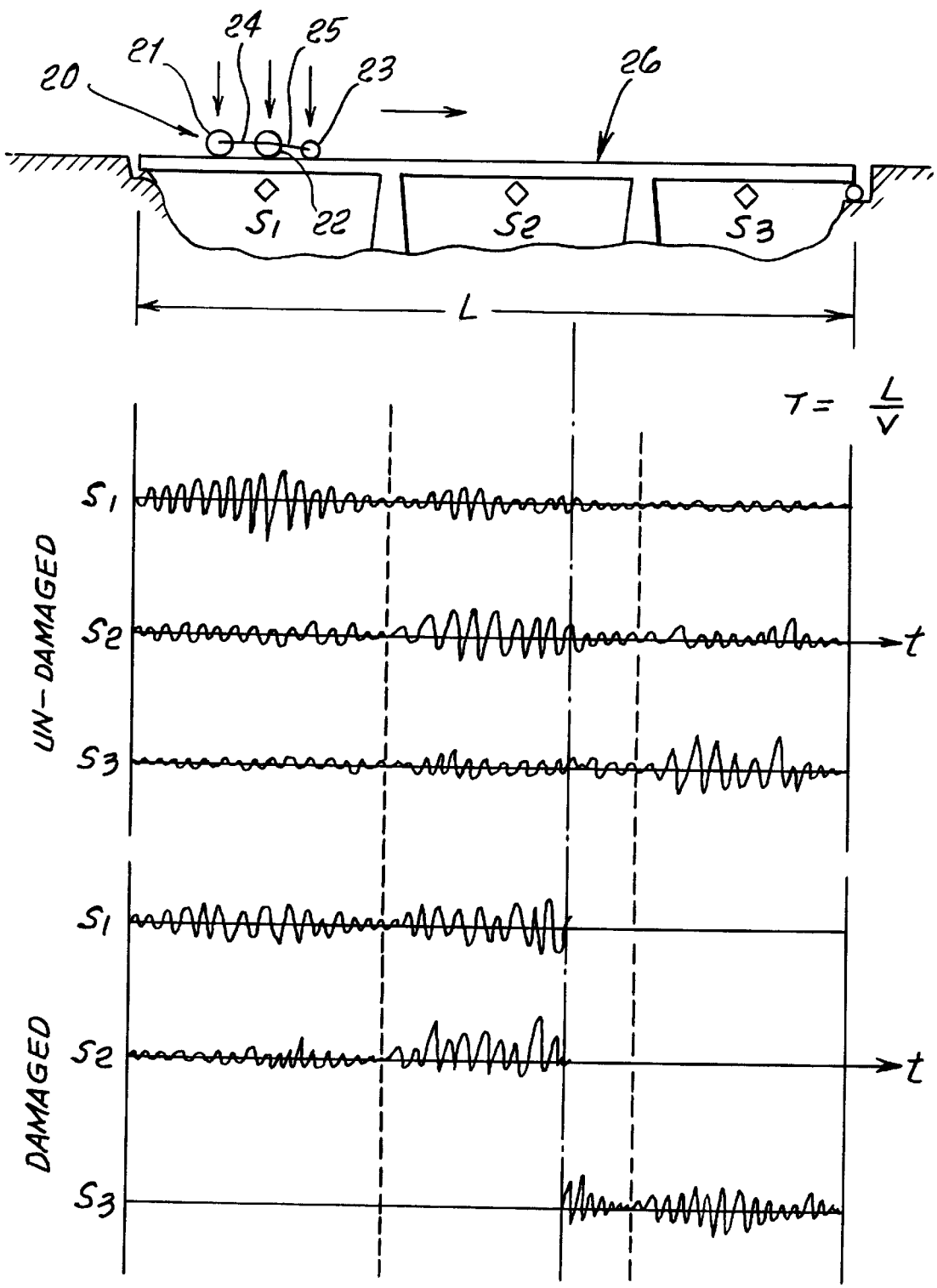

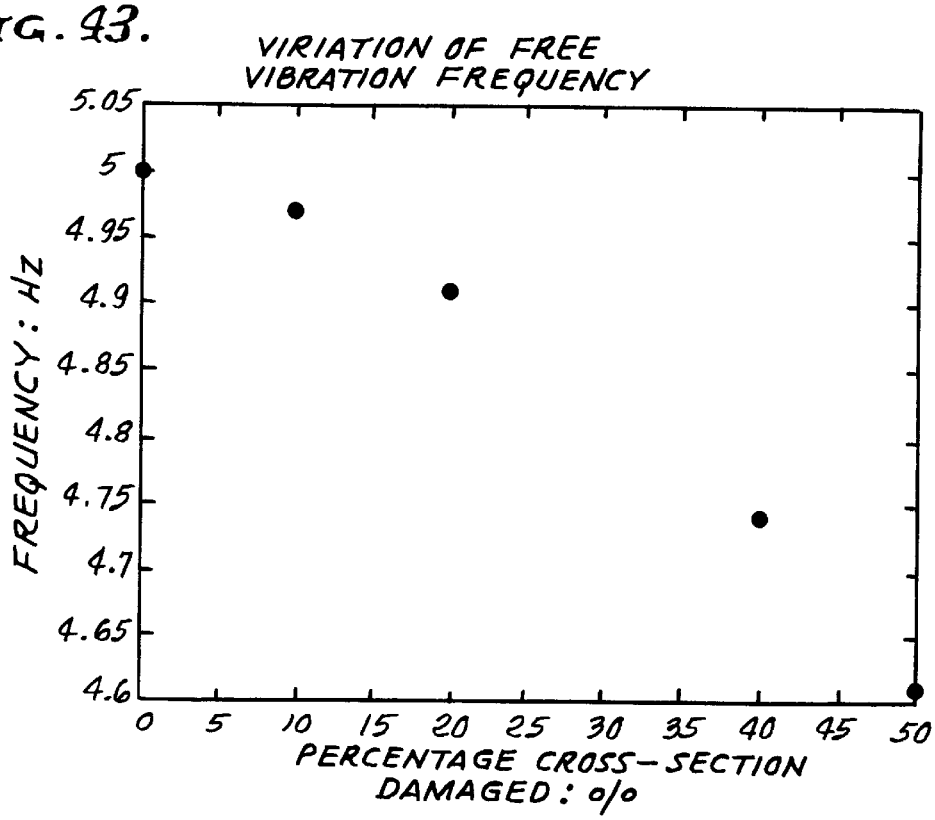
FIG. 43. VIRIATION OF FREE VIBRATION FREQUENCY
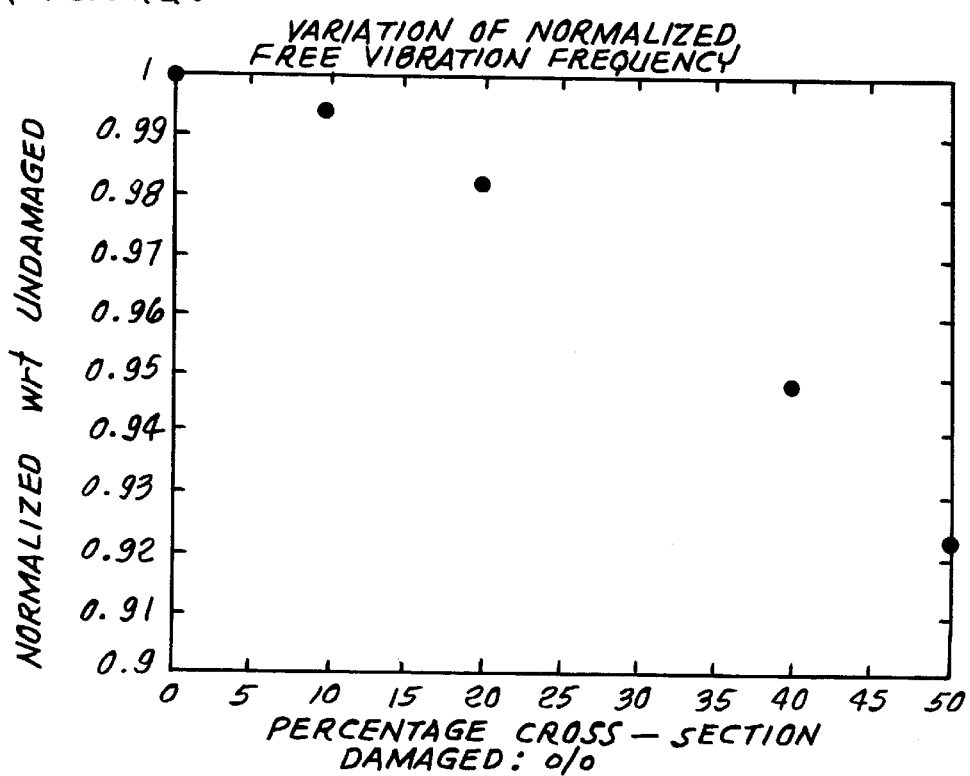
FIG. 44. VARIATION OF NORMALIZED FREE VIBRATION FREQUENCY

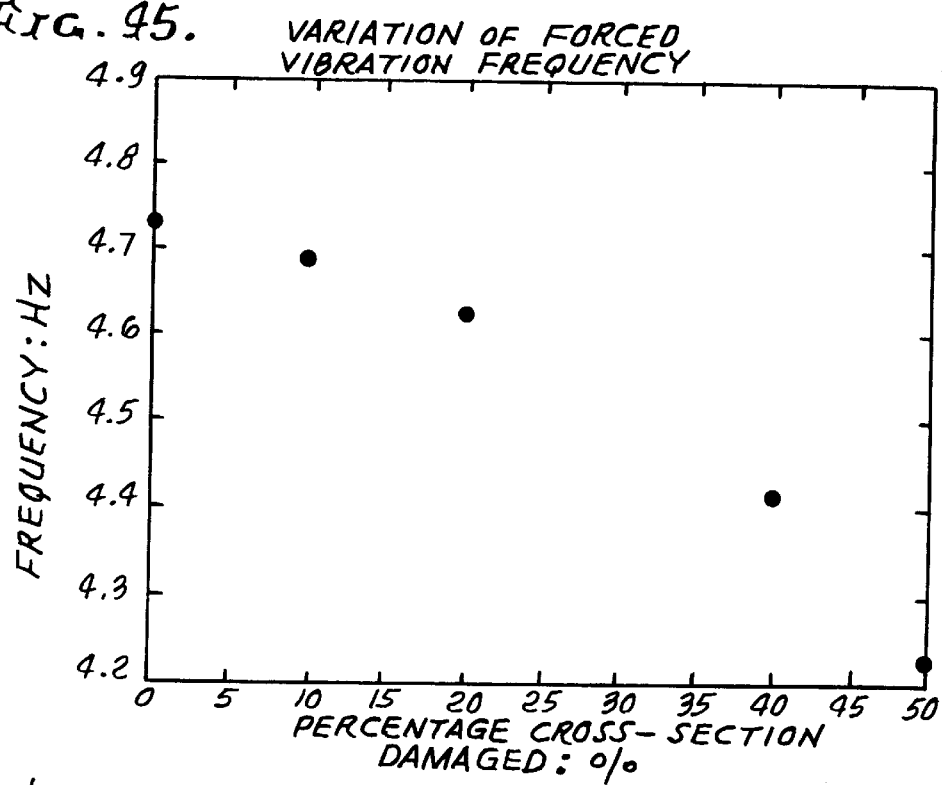
Fig. 45. VARIATION OF FORCED VIBRATION FREQUENCY
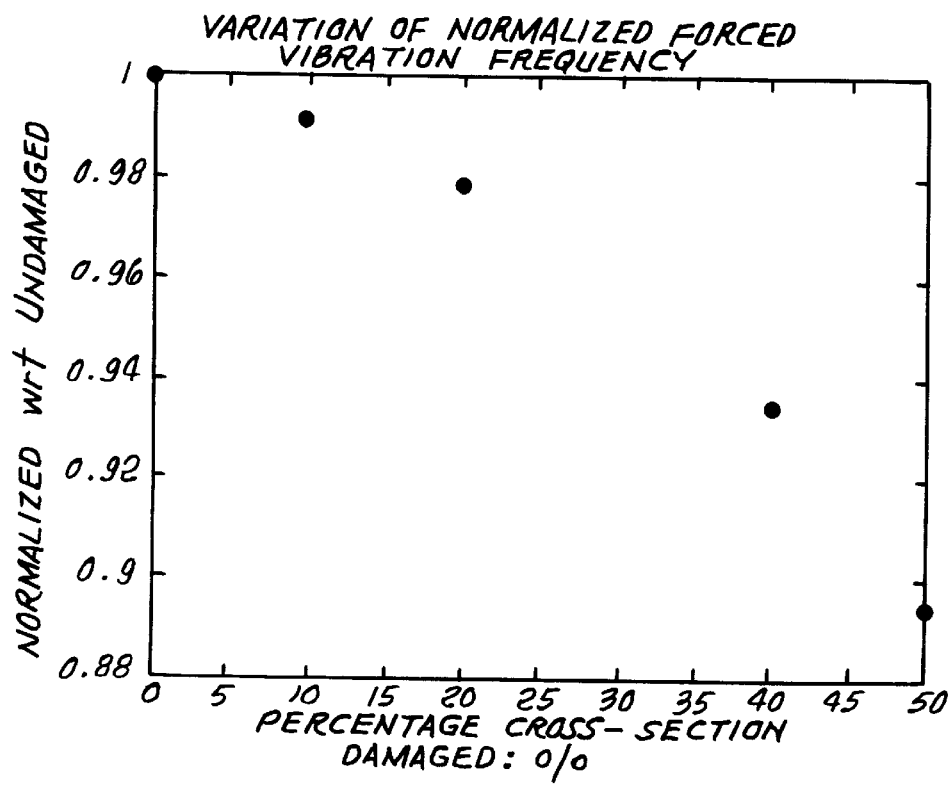
Fig. 46. VARIATION OF NORMALIZED FORCED VIBRATION FREQUENCY

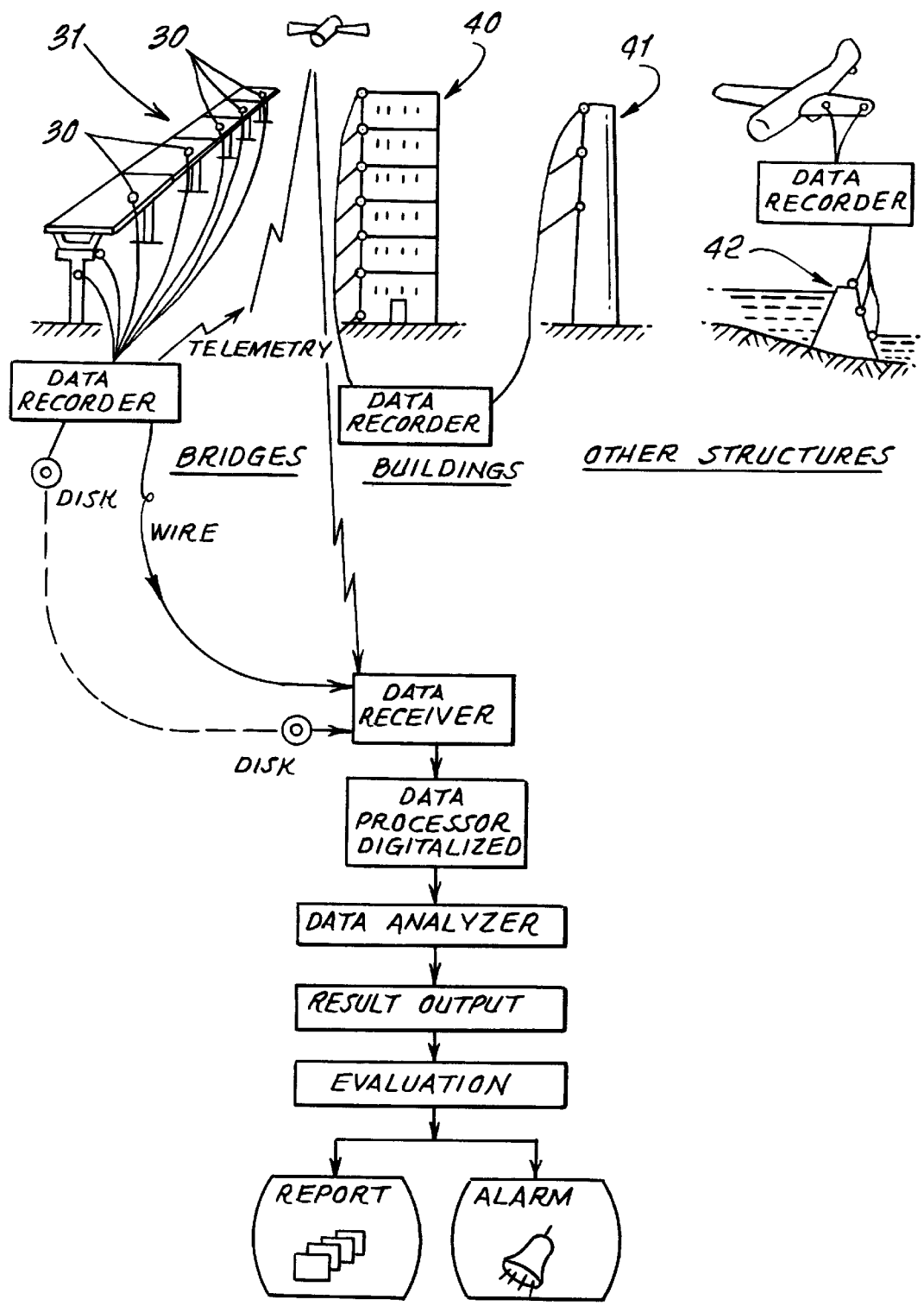

STRUCTURE SAFETY INSPECTION

BACKGROUND OF THE INVENTION

This invention relates generally to fault detection, in load bearing structures, and more particularly concerns improvements in methods and apparatus for determining locations of damage or faults in such structure, one example being bridges.

1. Introduction

To safeguard the safety performance of a civil infrastructure, such as a bridge, regular inspections are essential. At the present time, the inspection method is primarily visual. An experienced engineer or technician has to go through a bridge to examine each member and certify its safety. This method is subjective and flawed, for lack of rigorous standards. For example, for a bridge deteriorating from fatigue or aging, the damage is usually not clear-cut. Therefore, any call is judgmental. Furthermore, it is not feasible to use this visual method for complicated bridge structures; there might be members located at positions too awkward to access; there might be too many members that would require too much time to inspect; and there might be damage too subtle to detect visually. Because of these limitations, the visual inspection results are known to be incompletely reliable; yet, inspectors are forced to rely on it, today.

The safety of the bridges, however, is too critical and urgent a problem to be left in the present state for long; and it is a crisis of gigantic proportions considering the aging of many thousands of bridges. Since the greatest highway construction period of the US was in the late nineteen fifties and in the nineteen sixties, many bridges are reaching their service limitation at this time. In a recent survey by the Federal Highway Administration (Chase and Washer, 1997), 37% of all bridges in service were found to have some degree of structural deficiency. That percentage is increasing fast with the aging of the bridges; therefore, a reliable strategy has to be devised so that limited financial resources can be effectively employed in response to this national infrastructure crisis.

Ideally, any inspection method will have to satisfy the following conditions:

1. To be robust, objective, and reliable.
2. To be able to identify the existence of damage.
3. To be able to locate the damage.
4. To be able to determine the degree of the damage.

Visual inspection methods have clearly failed the first requirement, and thus have introduced uncertainties in the rest of the requirements. This requires the conclusion that non-destructive inspection methods should employ precise scientific sensors coupled with rigorous data analysis. That approach has been the central theme of research in the Bridge Management Program, Turner-Fairbank Highway Research Center, Federal Highway Administration. A large research program of research and development in new technologies for the nondestructive evaluation of highway bridges has been initiated. The objectives are locating, quantifying, and assessing the degree of damage of the bridges in supporting of the bridges. Although various technologies have been developed, such as Infrared Thermography, Ground-Penetrating Radar, Acoustic Emission Monitoring, Eddy Current Detection and others, none of them are practical. The difficulties of such systems are due, mostly, to their limited field of view. One must locate the damage first before he can use sophisticated imaging devices to examine the damage, in detail. For a complicated structure, locating the damage is more than 90% of the job. As a result, even with the advances of these esoteric techniques, the data used in bridge management today is still based almost entirely upon unreliable visual inspection.

SUMMARY OF THE INVENTION

A viable alternative approach lies in the structure damage identification and health monitoring through use of changes in structure vibration characteristics.

The general topic of monitoring the health of structure through vibration has been a subject for extensive reviews by Doebling et al (1996) and Salawu (1997), and it has also been the topic for large Symposia (Natke, Tomlinson and Yao, 1993, and Chang, 1997). For bridges in particular, the subject has been reviewed by Salawu and Williams (1995a and b) and Blandford (1997). The present invention provides improvements in non-destructive damage detection in general, and for bridges in particular. The new approach is characterized in only a Nondestructive Instrument Bridge Safety Inspection System (NIBSIS) Using a Transient Load, which demonstrates its feasibility and practicality through numerical modeling. An extension of this method is applicable to other types of structural damage detection, such as in building damages and mechanical system faults.

2. The Present State-of-the Art, A Review

The approach of using dynamic response and vibration characteristics of a structure to detect damage is the theoretical foundation of instrumental safety inspection methods. It has also been the mainstream of research for more than thirty years. Doebling, et al. (1996), has reviewed the available literature of this approach. The practical problems associated with this approach have also been reviewed by Farrar and Doebling (1997) and Felber (1997). The basic idea is straightforward: in principle, each structure should have its proper frequency of vibration under dynamic loading. The value of this proper frequency can be computed based on well established formula (see for example, Clough and Penzien, 1993). For a general single degree of freedom beam as in a bridge, the stiffness of the beam, K, can be computed as follows:

$$K = \int_0^L k(x)\varphi(x)^2 \, dx + \int_0^L EI(x)\varphi''(x)^2 \, dx + \sum_j k_j \varphi_j^2 - \int_0^L N(x)\varphi'(x)^2 \, dx, \tag{1}$$

in which k(x) and kj are the distributed and discrete external spring support; E is the Young's modulus of the beam; I(x) is the moment of inertia of the member, N(x) is the axial force, and $\phi(x)$ and $\phi$j are the generalized displacement function defined as $$D(x,t)=\phi(x)d(t), \tag{2}$$

where D(x,t) is the true displacement, and d(t) is the generalized coordinate. By the same argument one can also compute the effective mass, M, of the member given as $$M = \int_0^L m(x)\varphi(x)^2 \, dx + \sum_j m_j \varphi_j^2 + \sum_j n_j \varphi_j'^2, \tag{3}$$

in which m(x) is the distributed mass of the member, nj is the external mass inertia.

In most instances, the situation is much simpler. For example, for a simply supported bridge, we only have the second and third terms of Eq. (1) and only the first term of Eq. (3) being non-zero. If we assume that support to be a perfect bridge, we would only require the second term of Eq. (1) to be non-zero. Therefore, the stiffness is determined only by the integrated value of the moment of inertia, which, in turn, depends on the effective cross section. With both the stiffness and effective mass known, the proper frequency of the vibration, w, is calculated as $$\omega = \left(\frac{K}{M}\right)^{1/2}. \tag{4}$$

Sound as this argument is, the instrument inspection system has never worked successfully. The reasons are many: first, there is the lack of precision sensors to measure the detailed dynamic response of the structure under loading. Secondly, there is a lack of sensitivity of the structure in response to local damage, because of the large safety factor built in. A damage up to 50% of the cross-section can only result in a few percentages vibration frequency changes. Such a small frequency shift, when processed with conventional methods, would be totally lost in the inevitable noise in all real situations.

Although use of sensors presented real problems, along with the recent advances in sensor technology, the presently available sensors are sensitive enough for the detection of minute changes in displacement and acceleration. On the other hand, the lack of signal analysis methods for highly transient and nonlinear vibration data is a real and pressing need. In fact, if the data processing method can be made more precise, the problem of lack of sensitivity can also be circumvented.

According to the traditional method, the proper frequency can only be computed through Fourier analyses, from which the time domain data become purely frequency domain data. The data are always assumed to be stationary and linear. Under such a restriction, if one has a perfect record of the undamaged structure as a reference, one would be able to determine the change of the proper frequency. But such a result will not reveal the location of the damage. The most serious problem is that, as a rule, we do not have data from the undamaged structure as the reference. Recent advances in data analysis methods have provided some solution to the problem, yet, in balance, the data processing problem is still the most pressing need. As will be seen herein, use is made of the newly invented Hilbert-Huang transform (HHT, Huang et al. 1998, and Huang, 1996) to process the data for damage detection. Because the HHT can process nonlinear and nonstationary data, with the adoption of the HHT, we can also use the most logical loading condition, the transient load, for damage detection. As the data processing method is of importance in determining the testing condition; therefore, before discussing the data processing methods, we will examine the loading condition first.

2.1 Loading Conditions

The loading condition for bridge damage detection has been reviewed by Salawu and Williams (1995a and b). Because the data processing methods are mostly limited to linear and stationary processes, the loading conditions will have to be such as to produce such data sets tailored to fit the available analysis methods. As reviewed by Salawu and Williams (1995a and b), there are two loading conditions frequently used; the free and the forced vibrations.

2.1.1 Free Vibration

In the free vibration test, the structure is not under any live load other than the one that triggers the vibrations. This load can be an impulse, or any residual vibrations from a transient loading. Unless artificially arranged, the free vibrations of bridges are usually linear but with time varying amplitude due to the structure damping. The frequency can be determined to a high degree of accuracy with Fourier analysis. Yet, without a reference state from a healthy bridge, the free vibration is not very informative. Under special conditions when the structures become nonlinear due to damage, the free vibration could be used to detect damage. Since the vibration is analysis in frequency space, it cannot provide any information on the damage location.

2.1.2 Forced Vibration

In forced vibration, the structure is under some loading, which can be artificial or ambient forces. Ambient forces include those from the traffic, the wind, and the earthquake. All these loads are assumed to be stationary, a condition that is hardly ever true. As for linearity, it is also questionable. For example, since the wind force is proportional to the squared velocity, it is certainly not linear. The ground motion from a strong earthquake can also be nonlinear. One of the loading conditions is a special artificially induced vibration from a point source from a point source from a vibrator. Then the location and the magnitude of load are all critical to the success of the test (Felber, 1997). Such data, though relatively easy to interpret, are hard to be applied effectively, for the application points are usually different from the unknown damage location. Therefore, the force would not produce a diagnostic data as effective and sensitive as the ones that are just applied at the damaged spot. The traffic and the wind data are uniformly applied to all the structure that certainly include the damage locations. Then the signal to noise ratio becomes a critical issue. If a light load is applied, the response is not sensitive to the local damage. If a large load is applied, the deformation will be larger and the responses could be nonlinear. Furthermore, the random nature of the loading condition will make the signal (from the damage) and noise (from the ambient load) ratio too low to reveal the damage clearly. The most effective loading condition should be the one with a transient load. This is equivalent to a point source applied to every load bearing part of the structure. Such data, however, are certainly nonstationary. If the loading is up to the designed standard, the deformation of the damaged bridge will also be nonlinear. Thus, the most effective loading condition will produce nonlinear and nonstationary data, a problem which presently available methods are unable to handle. We will now review the data processing method as follows:

2.2 Data Processing Methods

As discussed by Huang et al (1998), Fourier analysis is of limited use in processing nonlinear and nonstationary data. Yet for lack of alternatives, it is still used extensisvely, though seldom in its bare from as in Basseville et al. (1993) and Hanagud and Luo (1993). Fourier analysis, however appears in almost all other methods of analysis such as Wigner-Ville distribution, Modal, Wavelet, and even, Hilbert analyses as will be discussed later. In fact, the frequency determination from any data is almost all based on Fourier analysis, yet Fourier analysis is for linear and stationary data only. The lack of a nonlinear and nonstationary signal processing method has made the random vibration approach inconclusive as a method for non-destructive test of bridge and structures. Detailed summaries of the lessons learned from this approach are given by Salawu and Williams (1995a and b), Farrar and Doebling (1997) and Felber (1997). Recently, there are some new data processing methods induced to accommodate the nonstationary and nonlinear data. These methods are the subjects of the following review:

2.2.1 Model Analysis

The modal analysis was proposed as an adaptive method for analyzing stationary random data (see for example, Pandit 1991). When applied to analyze deformations of a structure, the modes involved have been reduced drastically. Stationarity (or homogeneity) is usually assumed. This should not be a serious problem for the lower modes. Unfortunately, the modal analysis depends on the global deformation of the whole structure. To determine the various modes of deformation, there must be a large number of sensors. Even with the detailed data, the sensitive is still low for local damages. To do such analysis, more and more detailed data on the deformation shape is needed, which means more and more sensors. As the analysis is a global one, without a prior knowledge of the damage location, the locations of the sensors and the points of loading application cannot be determined effectively. As a result, the data collection would not be very sensitive to the existence of damages as discussed by Farrar and Doebling (1997).

Recent developments, however, have alleviated some of the difficulties mentioned above. For example, Kim and Bartkowicz (1997) have proposed methods with limited instruments; Stubbs and Kim (1996) have proposed methods to infer the reference state from measured data; Vakakis (1997) proposed nonlinear normal mode expansion; and Fahy (1994) and Doebling et al. (1997) have proposed energy-based methods to improved damage location. All these improvements notwithstanding, the real test of bridges and large structures still present great problems in modal analysis as shown by Alampalli et al. (1997) and Juneja et al. (1997). They showed that, even with good reference data, the noise from the real system and measurements could still cloud the picture and render the detection and location of the damages difficult. The most critical drawback in the modal analysis is still its requirements of prior analytical or test data of the undamaged state as a reference. For most of the cases, such data are not available. Secondly, the location of the damage from the modal analysis requires the determining the high mode of deformation. Therefore, modal analysis will require very detailed deformation measurements from many sensors. Therefore, this method is quite expansive to implement. Furthermore, noise removal and simplification of the structural deformation to a finite number of modes all present problems (Kim and Stubbs, 1996). To overcome this, the modal analysis is usually conducted jointly with Wigner-Ville distribution, or wavelet analysis.

2.2.2 Wavelet Analysis

The Wavelet analysis is an adaptive window Fourier analysis (see for example, Chui, 1992); therefore, it can accommodate the nonstationary data (Dalpiaz and Rivola, 1997). The Wavelet, however, is still Fourier type of transform; therefore, it should be limited to linear systems. Furthermore, the conflicting requirement of localization (with a narrow window) and frequency resolution (with a wide window) renders the final results from the most commonly used wavelets satisfying neither satisfactorily as discussed by Huang et al. (1998). Even with this flaw, wavelet analysis still gives a time-frequency distribution of the energy from the signal with uniform resolution; therefore, it has been used by Surace (1994), Staszewski et al. (1997), Basu and Gupta (1997), and Al-Khalidy et al. (1997). One possible usage of the wavelet analysis is to detect the singularity on the signal due to a sudden change of signal properties. Such changes, however, is rare in the bridge damage problem.

2.2.3 Wigner-Ville Distribution

The Wigner-Ville distribution method has been thoroughly discussed by Cohen (1995). Brancaleoni et al. (1993) and feldman and Braun (1995) have tried to use it in damage detection with some limited success. As Wigner-Ville distribution is also Fourier based, it suffers all the shortcoming of the Fourier analysis. Further, its result is not strictly local; therefore, its ability of identifying the damage location is also limited.

2.2.4 Neural Network

Application of the neural network has found its way in damage detection as earlier as 1991 by Wu et al. (1991). Many investigators have extended the applications as by Tsou and Shen (1994), Manning (1994), Pandey and Barai (1995), and Barai and Pandey (1995, 1997). Most of the application is to train the program to construct the reference modes or to reduce the noise in the data (Barai and Pandey, 1995); therefore, this application is still mode based. Any drawbacks in the modal analysis cannot be fully eliminated but only partially ameliorated. For a true solution, we have to find a method than can produce localized analysis as well as accommodate nonlinear variation in the data.

The Hilbert transform certainly fits the requirements, but there are also limitations as it has been used before. This will be discussed in the following section.

2.2.5 Hilbert Transform

The application of the Hilbert transform to nonstationary data has been proposed long ago (see for example, Bendat and Perisol, 1986). Its application in identification of damage has been tried by Feldman (1991, 1994a and b), Feldman and Braum (1995), Braum and Feldman (1997), and Feldman (1997). In all these studies, the signal has to be "monocomponent", i.e. without riding waves and, furthermore, the signals require symmetry with respect to the zero-mean. Thus, the method is limited to simple free vibrations., Although Prime and Shevitz (1996) and Feldman (1997) have used it to identify certain nonlinear characteristics through the frequency modulation in a nonlinear structure, the limitation of the data renders the method of little practical application in both identifying and locating structural damage. Amongst all the Hilbert transform applications the most relevant one was due to Brancaleoni et al. (1993) who employed a transient load over a damaged bridge. Confronted by the limitations of straightforward application of the Hilbert transform to an arbitrary data as discussed by Huang et al. (19987), they have to resort to filtering of the data to separate the data into different modes. As the filtering process is Fourier based, it will alter the nonlinear properties of the data drastically. The real value of the use of Hilbert transform is only found in the Empirical Mode Decomposition method, which is an important feature of this invention.

2. The Hilbert-Huang Transform

With all the shortcomings of the available methods, the present invention proposes a totally different approach: to use the dynamic response, but to analyze the data with the newly invented Hilbert-Huang transform (H H Y, Huang, 1996 and Huang et al. 1998), which is designed not only for nonstationary but also nonlinear data. Basically the invention recognizes that the proper frequency will change abruptly when there is structure damage, or gradually when the structure deteriorates due to corrosion and fatigue. Some of the frequency changes could be very drastic while others can be subtle. Therefore, if the structural properties were alternated by the damage or by the deterioration or failure of certain critical structural members, the corresponding proper vibration frequency under a dynamic loading condition would change accordingly, but locally. Any method employed will have to determine the proper frequency variation temporally (or spatially) precisely enough for pinpointing the damage locations and for assessing the degree of the damage. To make the test data clean and sensitive to the local damage, the test load constitutes a single moving design load over the bridge under controlled traffic condition. It can also be large enough to simulate the full design load of the structure to test the bridge to the full nonlinear response range. The moving load will pass every section of the bridge, therefore, it would encounter the unknown damage spot, if it exits. When the loading is right over the damaged spot, the reaction or response will be the most pronounced. This moving test load condition is a generalization of single impact loading. Furthermore, with strategically located sensors, and with situ loading monitoring, the data reveals not only frequency changes, but also the location of such changes. A critical element of this approach is the newly invented method of Hilbert-Huang Transform which consists of the Empirical Mode Decomposition and the Hilbert Spectral Analysis (Huang et al. 1998, and the pending U.S. Patent Application of Huang, 1996).

In the present invention the HHT in a new Nondestructive Instrument Bridge Safety Inspection System (NIBSIS) Using a Transient Load is employed to analyze the deflection, vibration, or acceleration data from any structure measured by instruments to locate the damage, and to assess the condition at the same time. HHT is designed for processing nonlinear and nonstationary time series. With this method, the bridge response is analyzed under a moving design load crossing the bridge. The moving load will visit every section of the bridge; therefore, the response of every section of the structure can be tested. The locations of the damage can be determined from the response history monitored by strategically deployed sensors. The crucial evidence of the damage is revealed by three factors:

1. The response of the bridge under the design load condition will have nonlinear response should any section suffer damage.
2. The transient load position will reveal the location of such abnormal response.
3. The free vibration of the bridge after the passage of the test load will provide data to estimate the degree of the damage.

The justifications of these assertions is briefly summarized as follows: any structure under the design load should respond linear and elastically. The structure should reveal its proper frequency under loading as well as free vibration. When the structure is damaged, its strength will decrease. Such a structure, even under the design load, will have anomaly large deformation and behave nonlinearly. Because of the capability of HHT for processing transient and nonlinear signals, one can determine the precise location of the damage without a prior knowledge of the damage location.

More specifically, the inventive method of determining the location of structure damage to a bridge structure, employs the steps that include:

a) providing a transient load imposing device,
b) traveling that device onto the bridge and then along the bridge,
c) detecting bridge vibrating response including changes in frequency during such traveling,
d) and determining the position of the device in relation to a shift of frequency below a selected value.

As will be seen, the detecting step includes locating a vibration sensor at a position approximately mid-way between opposite ends of the bridge.

These and other objects and advantages of the invention, as well as the details of an illustrative embodiment, will be more fully understood from the following specification and drawings, in which:

DRAWING DESCRIPTION

FIGS. 2–46 are graphs;

FIG. 47 is a schematic diagram showing use of the method of the invention for bridges, buildings and other structures;

DETAILED DESCRIPTION

Before discussing the HHT method, it should be pointed out that Hilbert's transform has been applied to damage detection by investigators as discussed above. Without the proper treatment of the data through the Empirical Mode Decomposition (Huang et al. 1998), they could only apply the Hilbert transform to obtain the instantaneous frequency for simple monocomponent data that are nearly symmetric. Therefore, the detection of the damage is still dominated by the modal analysis. In the present approach, a transient load is used and takes the advantage of fully nonlinear and nonstationary process of structural response.

4. Case Study of Damage Detection Based on Deflection

The following is a discussion of an example of a model bridge with and without damage through numerically simulated data. In such first example, we will simulate data collected by a single strain gauge located at the mid-span where the deflection of the bridge is the largest.

Figure 1:
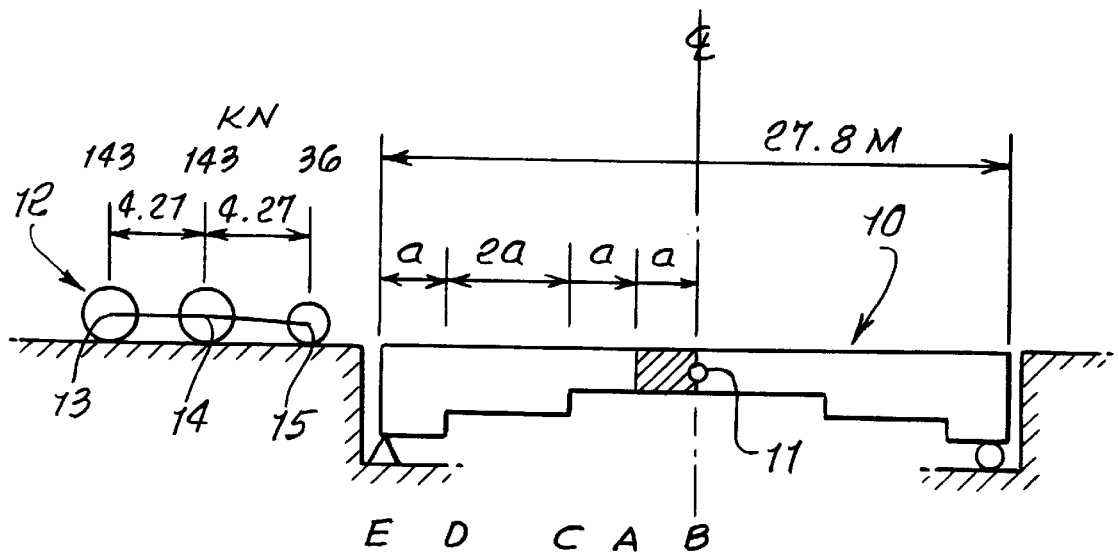
FIG. 1 is a schematic diagram of a bridge structure to be loaded and tested, in accordance with the invention.

The mode bridge is shown in FIG. 1. It is a simply supported bridge 10 of 27.8 m span with variable cross-section. The design load is a truck 12 having three wheel axles 13–15, and with a total load of 422 KN, distributed as 36, 143, 143 on the three axles. The truck is moved at 33 m/s across the bridge. Two cases are determined: case 1 is the perfect bridge without any damage; case 2 is the damaged bridge with its cross-section reduced near 50% for the section labeled "a" near the mid-span. The assumed parameters for the test cases are also given in FIG. 1. A single strain gauge 11 at the center point is employed to collect the response data of the bridge under the moving load.

Figure 4:
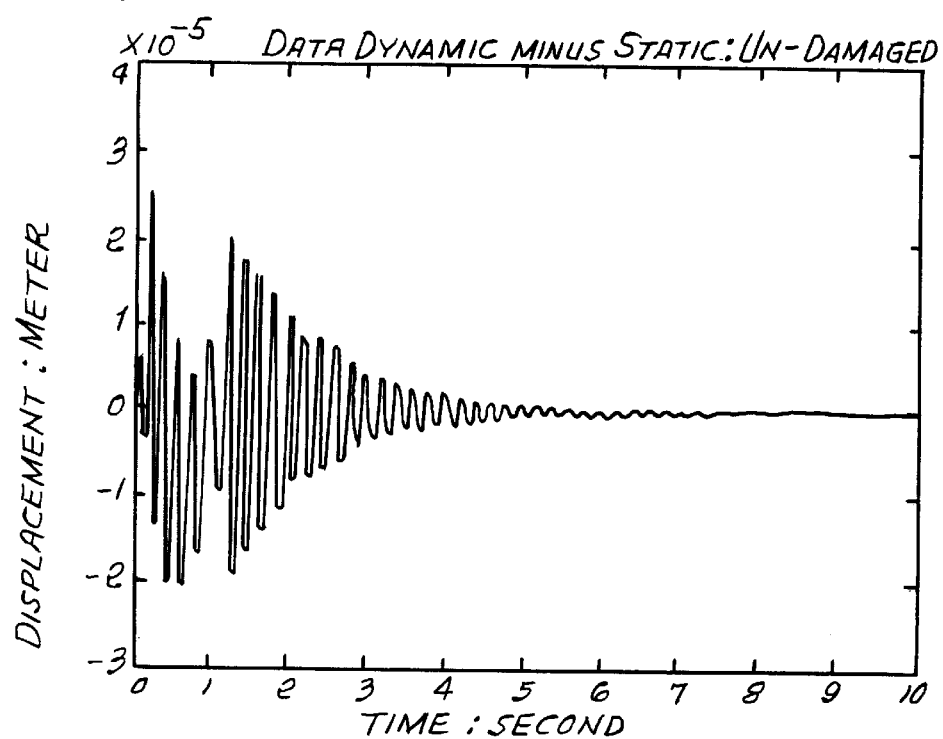
Figure 5:
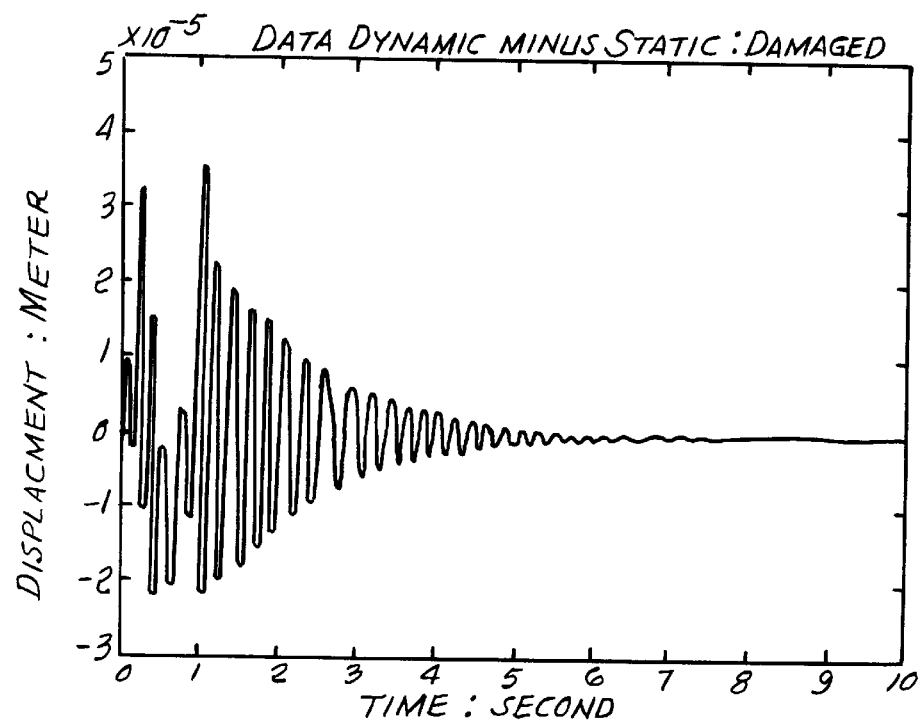
Figure 6:
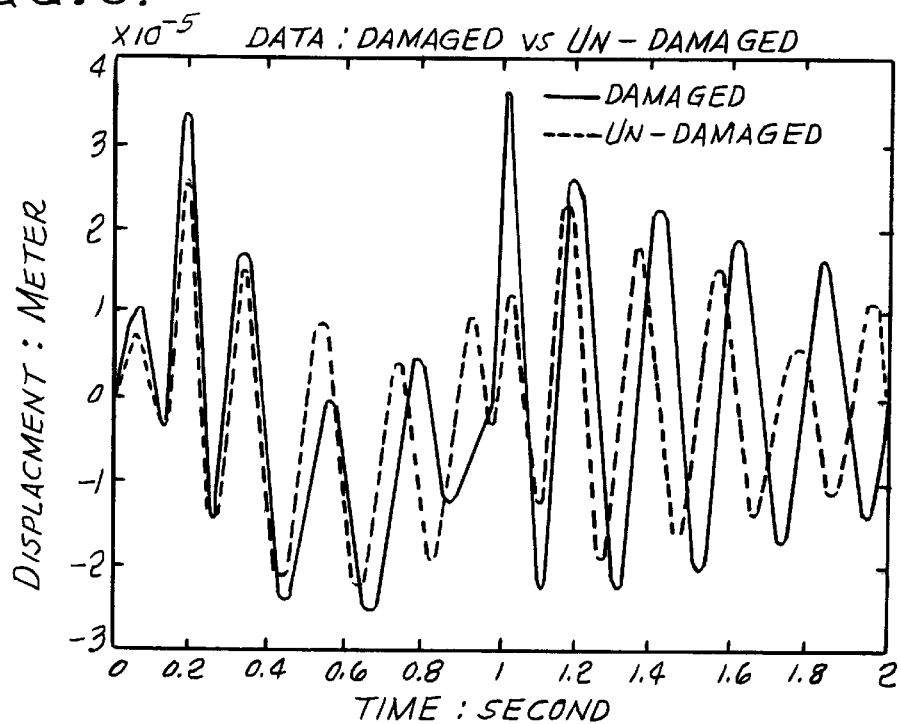

The deflection of the bridge is determined. FIG. 2 shows the deflection of the undamaged bridge 10; FIG. 3 shows the corresponding data for the damaged bridge 10. The data show both dynamic and static deformations. Such deformation can be obtained from a test by measuring the structure deformation twice. The static deformation can be obtained from a very slow moving test load; while the dynamic deformation can be obtained from a fast moving test load. The time span of the two different speeds of the test load will have to be re-normalized before carrying out the differencing operation. When the difference between the dynamic and the static load deformations is computed, the results are shown in FIG. 4 for the undamaged bridge, and FIG. 5 for the damaged bridge. Detailed comparison of the deflection data is given in FIG. 6. Clearly, the damaged bridge under the design load reveals the nonlinear characteristics of structure yielding at around 0.45 seconds from the starting point of the data which is the time when the load arrives on the bridge. This time is very near to that when the first 143 KN axial arrived at the damaged section, which can be calculated as follows:

$$\left(\frac{27.8}{2} \times \frac{4}{5} + 4.27\right) \div 33 = 0.47 \text{ sec}, \quad (5)$$

From this time on, the period of oscillation of the damaged bridge is much longer than the undamaged bridge. This is true also for the free oscillation after the truck passed the bridge at $$(27.8+4.27+4.27) \div 33 = 1.10 \text{ sec}. \quad (6)$$

Figure 7:
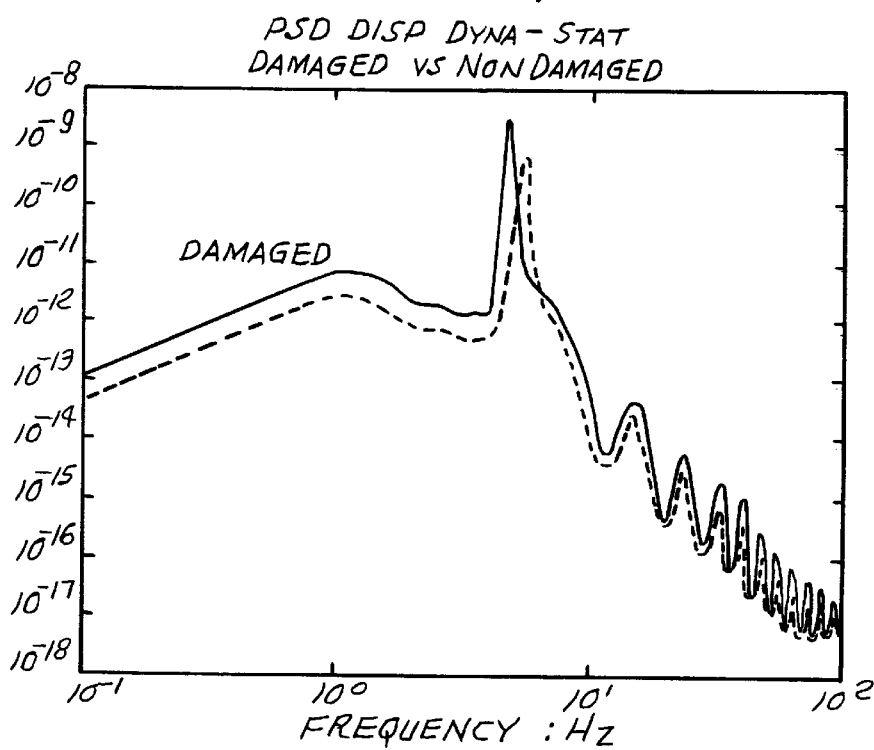

Fourier analysis of these data produces the spectra shown in FIG. 7. Although the damaged bridge indeed shows a frequency down shift (indicating the increasing of oscillating period), by the spectrum itself, one cannot state that the bridge is damaged. Since the Fourier analysis totally lacks time information, there is no way one can determine the location of the damage from the Fourier analysis.

Figure 8:
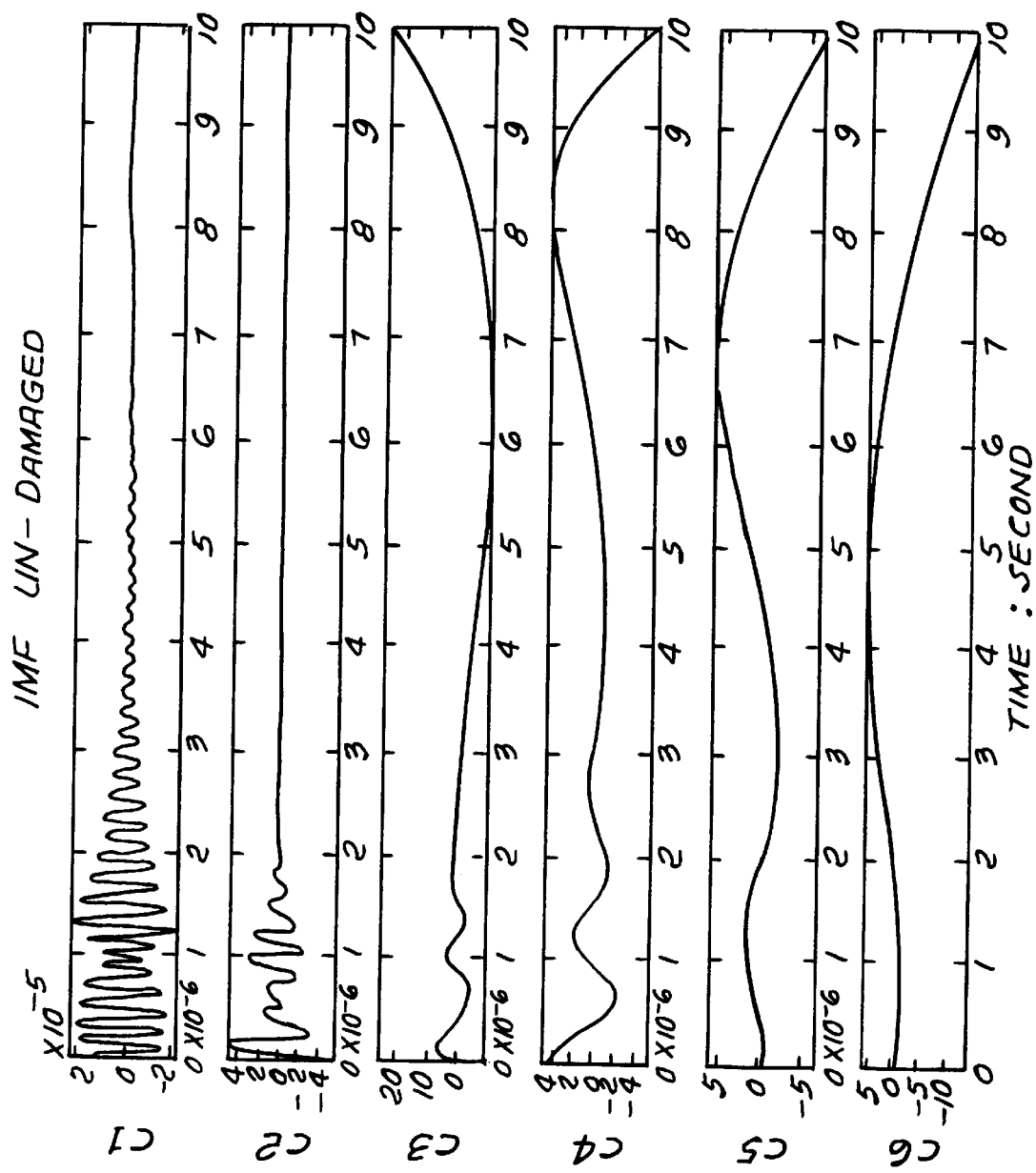
Figure 9:
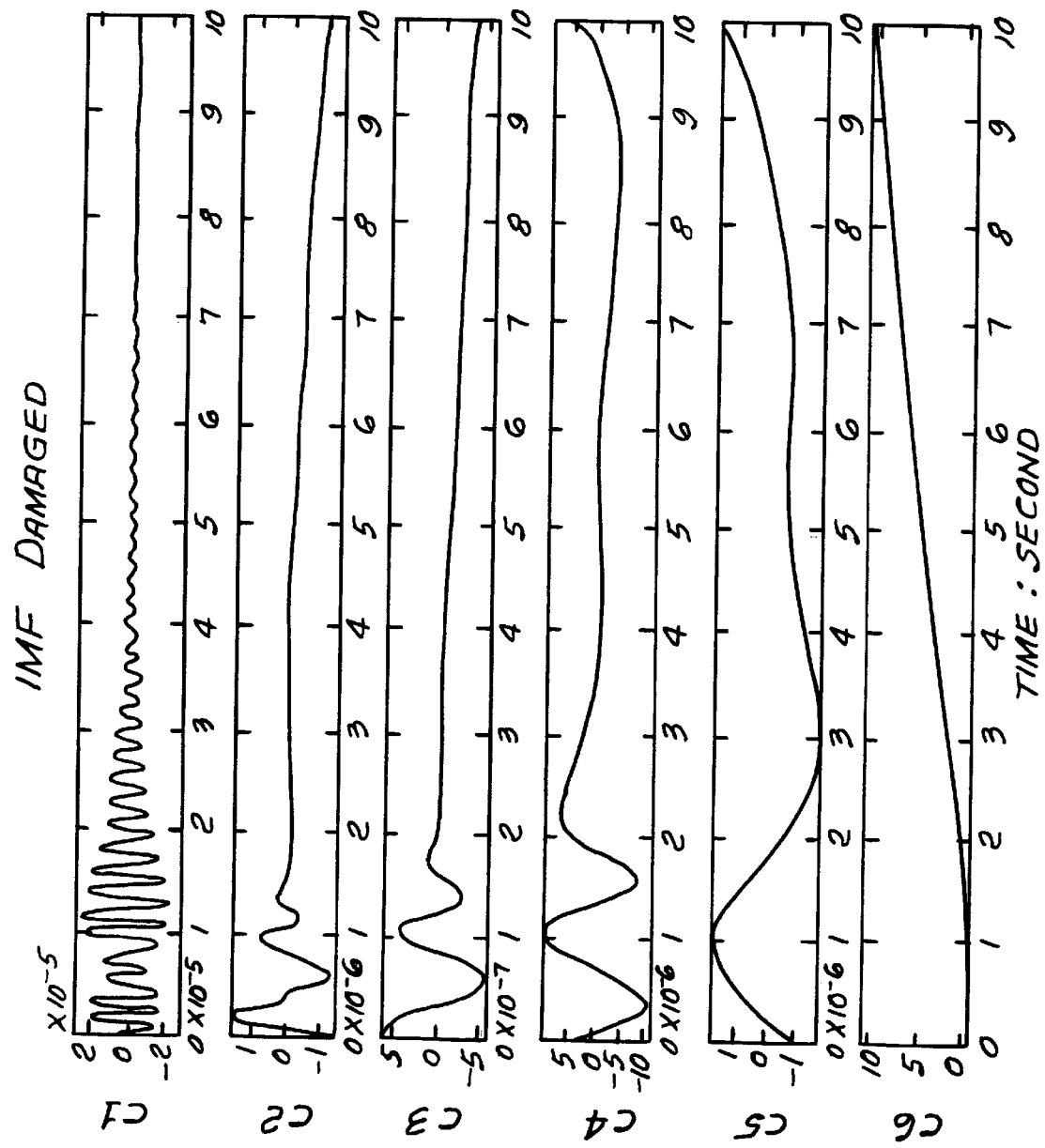
Figure 10:
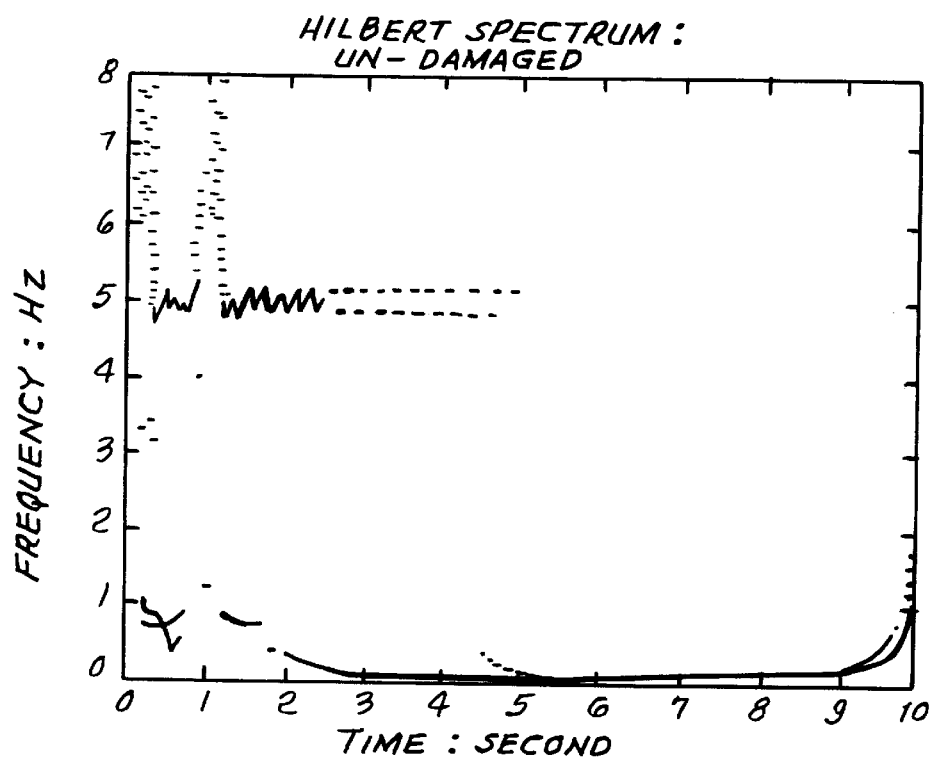
Figure 11:
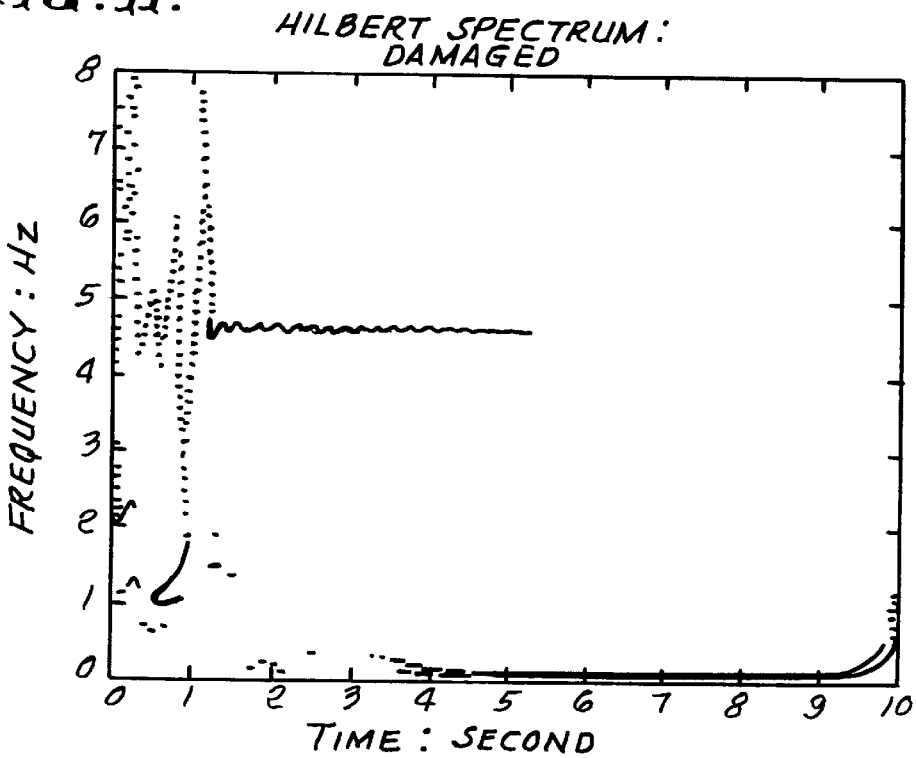

After application of the Empirical Mode Decomposition Method (Huang et al. 1998), the Intrinsic Mode Function components for the undamaged and the damaged bridges are shown in FIGS. 8 and 9. The most important components in both cases are the first ones. They represent 86.77% and 83.45% of the total energy in the respective cases. The Hilbert Spectra from the IMF's are given in FIGS. 10 and 11 for the undamaged and damaged bridge respectively. From the Hilbert spectra, one can see the most striking difference between the two cases is in the first second. These two figures are the most critical results of the present method. See discussion details as follows:

4.1 Based on the Deflection from the Free Vibration

The frequencies during the free vibration after the test load passed the bridges show absolute magnitude difference. The free oscillation frequency for the damaged bridge is around 4.6 Hz, while the corresponding value for the undamaged bridge is 5.0 Hz. Note a change of 8%, a value comparable to the modal analysis result by Farrar and Doebling (1997). This by itself is interesting, but it cannot be used as indicator for damage, for many bridges we do not have the undamaged state as a reference.

4.2 Based on the Deflection from the Forced Vibration

Because all the information is in the first component, the Hilbert Spectra is constructed from the first component only. In order to examine the frequency variation in details, the spectra are presented with the amplitude plotted logarithmically,. Since the information is in the first second, the close up of the first two second given in FIGS. 12 and 13 is examined.

Figure 12:
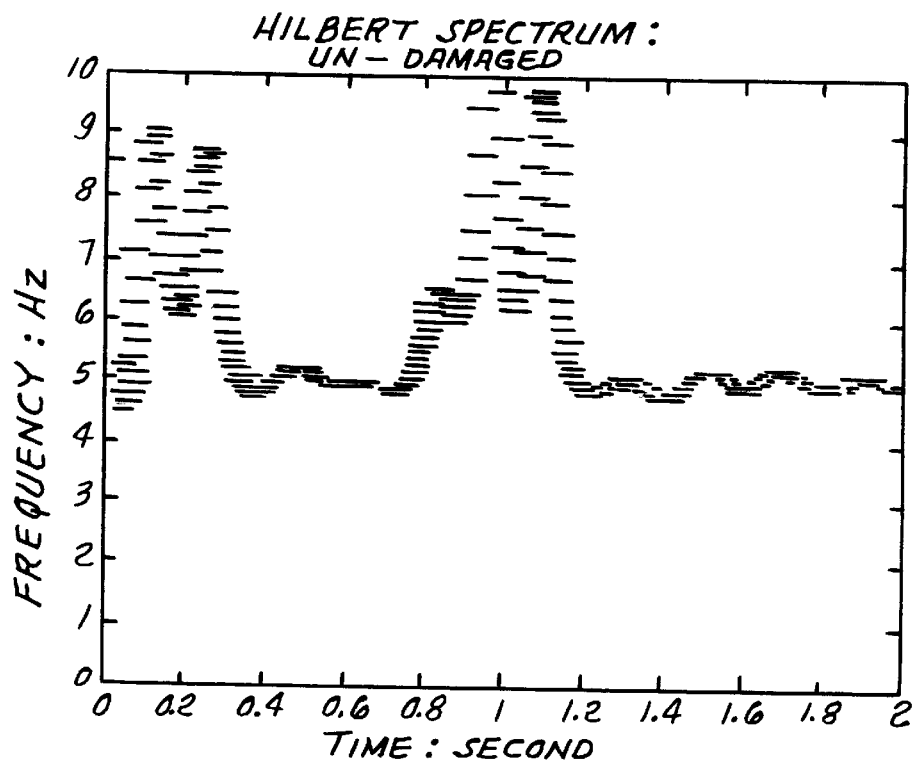

FIG. 12 gives the result of the undamaged bridge. The frequency of the bridge is highly variable as the test load first gets on the bridge, and as it gets off the bridge, each event lasted about 0.3 to 0.4 seconds. Otherwise, when the test load is on the mid-span, the bridge vibrates at its proper frequency with or without the test load. This invariance of the proper frequency indicates the load is within the designed limit, under which the bridge is responding linearly.

Figure 13:
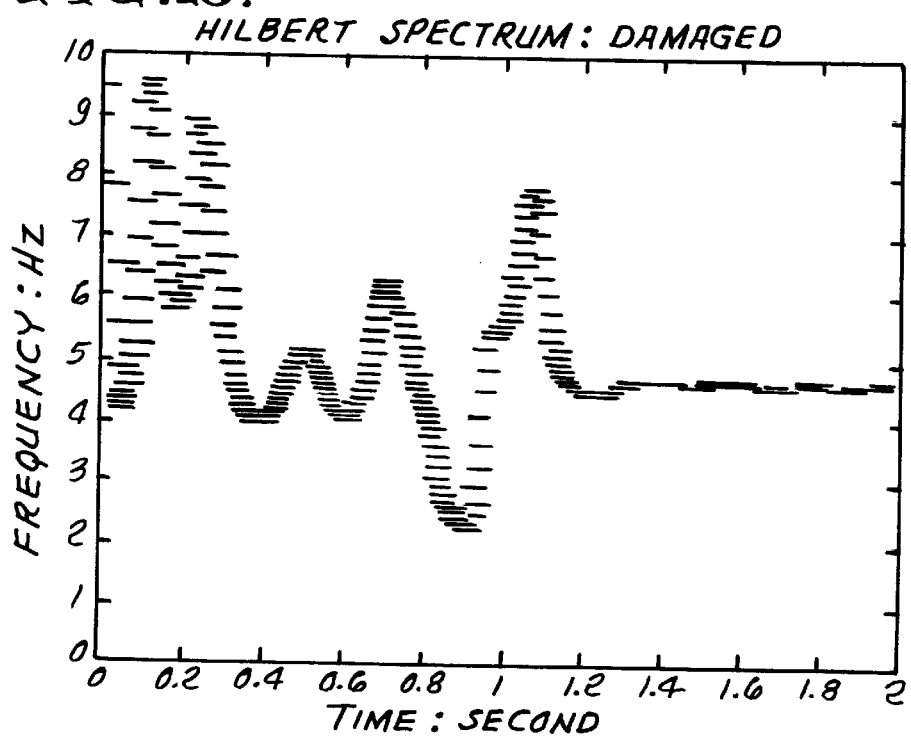

FIG. 13 gives the result of the damaged bridge. Again the frequency of the bridge was highly variable as the test load first gets on the bridge, and as it gets off the bridge. Different from the undamaged bridge, the instantaneous frequency of the bridge is also highly variable when the test load is on the mid-span. The variation of the instantaneous frequency indicates two causes:

First, the variation is due to the nonlinear behavior of the bridge. As the cross-section is only half of the undamaged case, the deflection might be over the linear elastic limit. The bridge is softening, and the frequency is lower. The frequency get so low that its value is lower than the free oscillation frequency after the test load passed the bridge. This is a critical indication of the damage. The damage is revealed and located both by the low value and by the variation of the instantaneous frequency. As discussed by Huang et al. (1998) the intra-wave frequency modulation is a clear indication of nonlinear oscillation.

Second, the transient characteristic of the load can help locate the damage spot. After the initial variation of the frequency due to the transient response when the test first gets on the bridge, the first time the frequency goes below the free oscillation value is the damaged location. This location is found to be near 0.4 second, as calculated above. The variations of the forced vibration frequency during the transient period are usually shifted to higher frequencies than the free vibration. While as the variations of the vibration frequency, when the test load is at the mid-span, are shifted to lower values than the free vibration. This is a crucial discriminator for damage detection.

Figure 14:
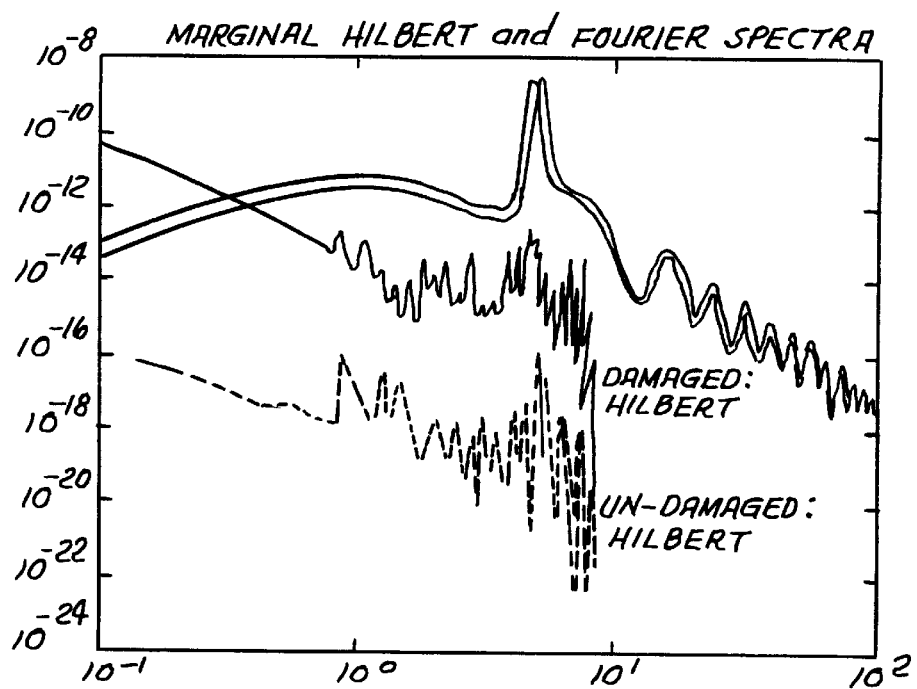
Figure 15:
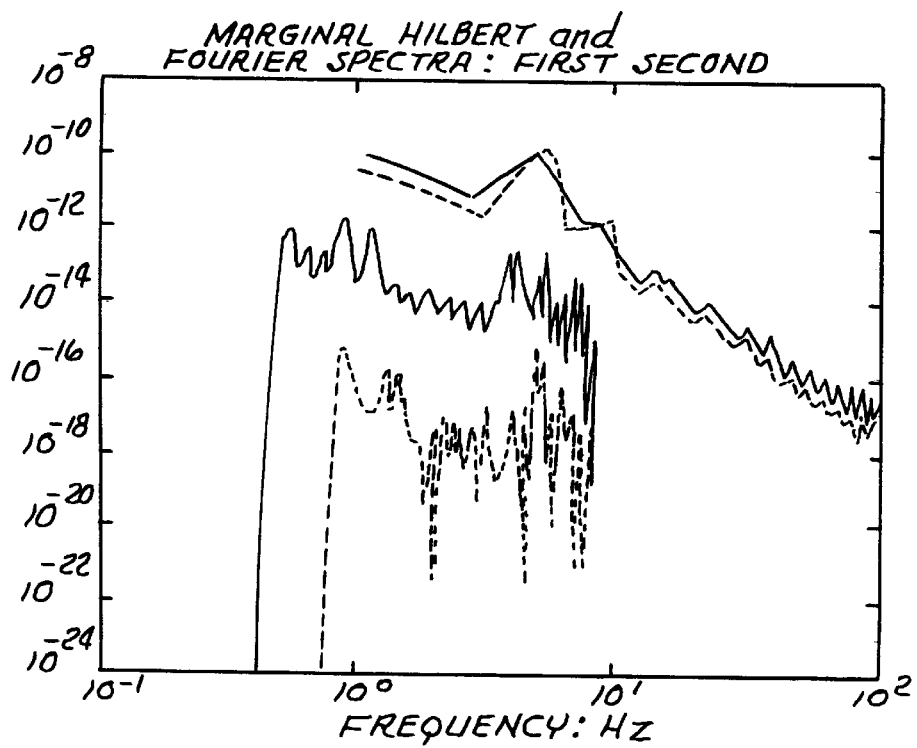

Other than the full Hilbert spectra, the marginal Hilbert spectra can also provide some limited information as shown in FIG. 14. They are plotted together with the Fourier spectrum. The undamaged bridge shows a clear peak of energy at the free oscillation frequency around 5 Hz. The damaged bridge also shows a peak at a slightly lower free oscillation frequency of 4.5 Hz, but the interesting feature is a broad shoulder of the spectrum between 3 to 4 Hz. This new peak is the result of the forced nonlinear response. To illustrate this case, the marginal Hilbert spectra is plotted for the critical first second in FIG. 15. There the most prominent peak for the undamaged bridge is again the free oscillation frequency, while for the damaged bridge is a broad range below the free oscillation frequency.

5. Damage Detection Based On Acceleration From Forced and Free Vibrations

Next, we will demonstrate NIBSIS using simulated accelerometer data to measure the dynamic response. Such acceleration data can be simulated easily by the second derivative with respect to time of the displacement record.

From the dynamic response of displacement computed, the second derivative is given in FIG. 16. The detailed view of the first two seconds is given in FIG. 17. The record showed a richness of high frequency noise in the damaged bridge. Other than the high frequency noise, the same overall characteristic as in the deflection is also shown here. The damaged bridge reveals the characteristic of structure yielding at around 0.45 seconds, which is almost exactly the time when the first 143 KN axle arrived at the damaged section. From this time on, the period of oscillation of the damaged bridge is much longer than the undamaged bridge. This is true also for the free oscillation after the truck passed the bridge at 1.10 seconds.

Figure 18:
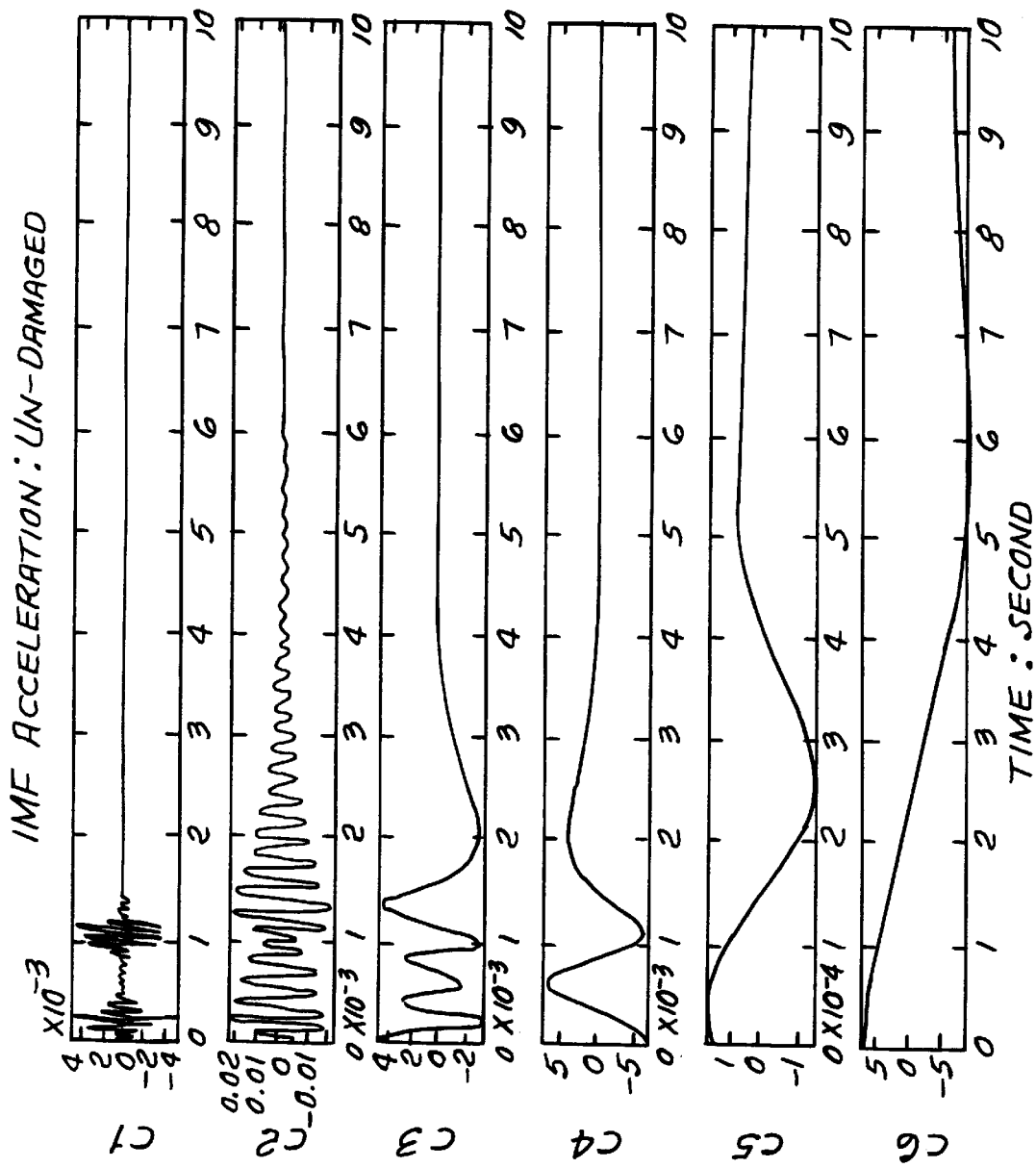
Figure 19:
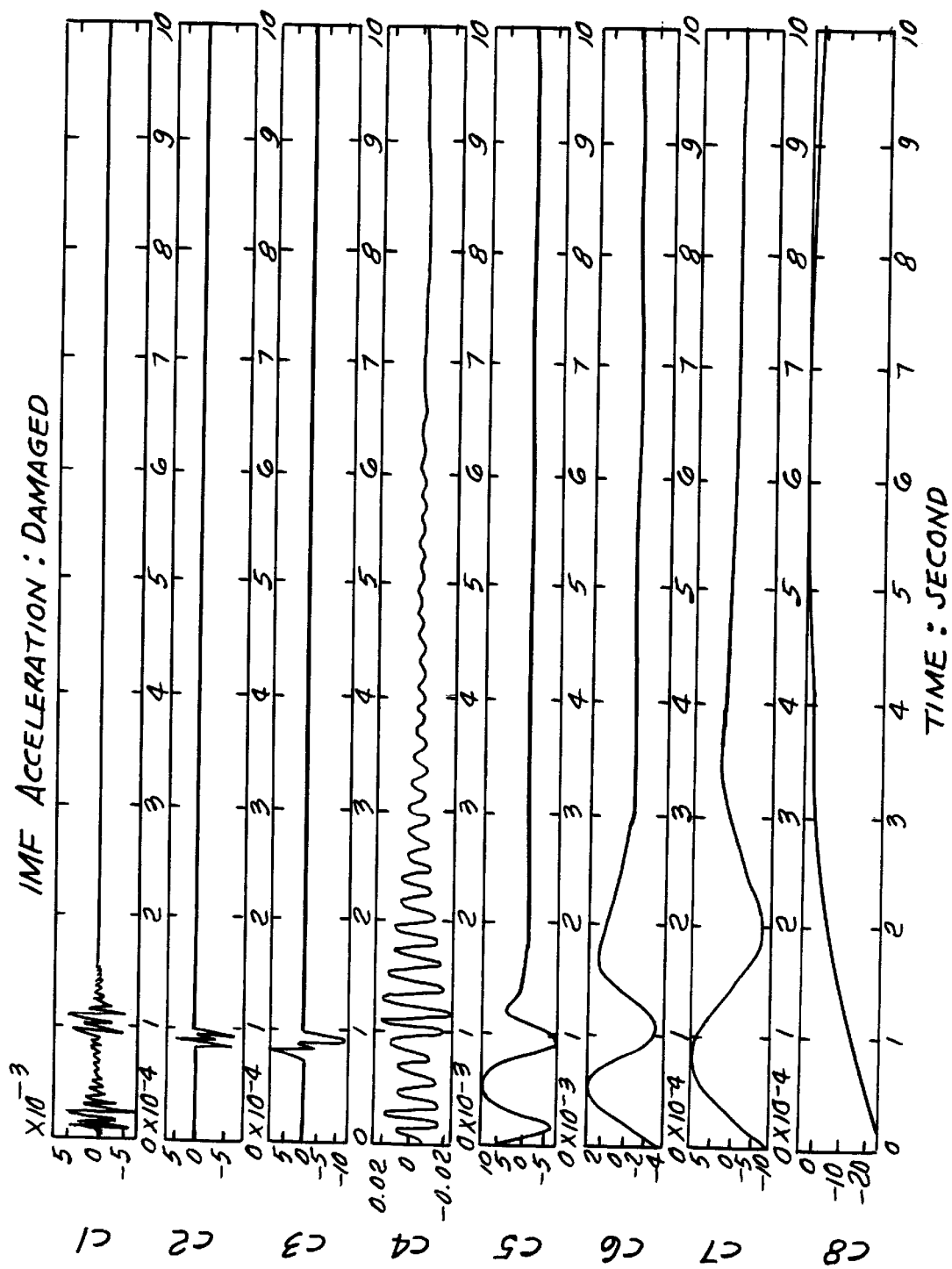

When the data are processed by the Empirical Mode Decomposition (EMD), the Intrinsic Mode Function (IMF) components are shown in FIGS. 18 and 19. On the IMF components, the most important ones are the $2^{nd}$ of the undamaged and the $4^{th}$ of the damaged. The first two second of these two main components are presented in FIG. 20. Again, the deviation starts somewhere around the 0.45 sec. The detailed Hilbert spectra of the data for the first 2 seconds are given in FIGS. 21 and 22. Again, the nonlinear and nonstationary effects show up clearly. Based on both of these characteristics, one can determine the location and the damage condition. The marginal spectra together with the Fourier spectra are given in FIG. 23. Here one can see that, though the main peaks of the vibration mostly from the free oscillation agree well between the Fourier and the marginal Hilbert spectra, the lack of the harmonics, and the existence of the low frequency components in the damaged bridge all indicate the power of the HHT approach in revealing the nonlinear characteristics of the damaged bridge.

Calibration of the variation of the free and force oscillation of the bridge give a means of determine the extent of the damage. This can be accomplished either by model, or by empirical approach, as will be discussed later.

6. Extension to Continuous Beam Bridge Structures

The extension of the NIBSIS method to the cases of continuous beam structure is also enabled. As shown in FIG. 24, strategically located sensors record the transient signals from a single moving load passing through or over the bridge to be tested.

For bridge safety inspection, one does not have to leave the sensors in position all the time. The sensors can be deployed only during the inspection period, which will last a very brief time, long enough to cover the passage of the test load. Recordp-from different instruments will be analysed to pinpoint the damage location, and the degree of damage or deterioration.

A schematic diagram for continuous bridge beam case is given in FIG. 24. The load exerting truck 20 has three wheels 21–23 with axles connected at 24 and 25 as shown. Sensors $S_1$–$S_3$ are located at mid-points of spans of the bridge 26, as shown. Two cases are considered: case 1 is for a bridge without damage; case 2 is for the bridge with a damage at the second span of a three span bridge. With the moving load velocity given, the location of the load can be converted from the time record on the data.

For case 1, load at any part of the bridge will transmit to all part of the bridge. The amplitude and frequency of the vibration can be calculated quite easily based on the established structural theories and design data. Therefore, the baseline vibration can either be recorded or computed before hand as a reference. Any variation or deviation from this baseline should be clear indicators for potential problems, especially the gradual changes due to the deterioration.

For case 2, the load at any part will not necessarily transmit to all parts of the bridge. The transmission ratio depends on the degree of damage, and the vibration frequency is an apparent indicator of the damage. In the schematic, the most drastic case is adopted when the damage is a clear breakage that results in no load transmission at all. Then, as the moving load travels through i.e. over the bridge, the damage location is clearly determined.

Any active bridge testing case should fall somewhere between the two extremes. The signals from this moving load will certainly be transient. These transient signals have been actively avoided in the past, but HHT can offer a clear answer. Furthermore, by employing this condition inspection technique based on transient loads, one can use it as continuous impulse loads and obtain better resolutions of the damage state of the bridge structure. Thus, the method of the invention is applicable to actual bridge structure.

7. Alternative Implementations

Figure 25:
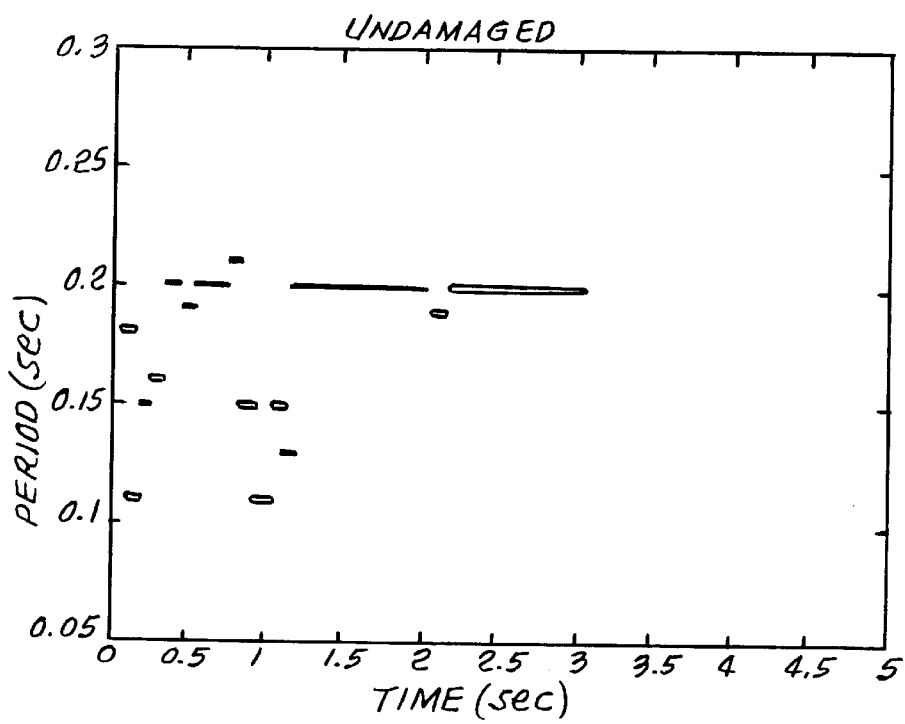
Figure 26:
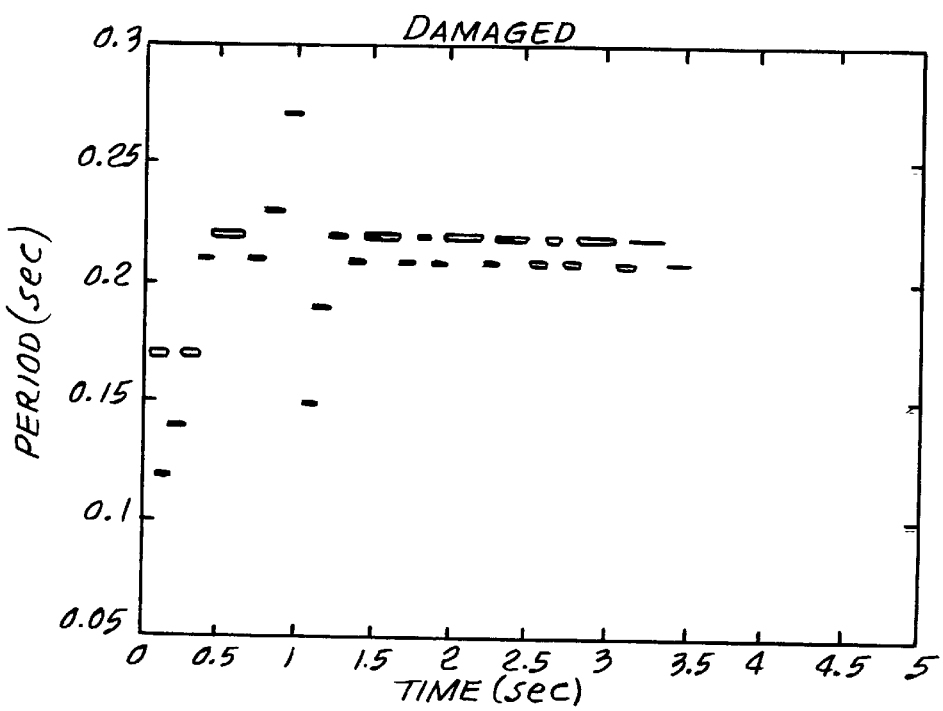

Many variations of the present approach can also be implemented. Some of these are discussed as follows:

Implementation without using Hilbert Transformation: A simpler method can also be implemented without the final Hilbert spectral analysis. Either before or after the EMD, one can use the data or the first IMF component to count the number or measure the periods of the oscillations as in FIG. 6. The results from the first IMF is shown in FIGS. 25 and 26 for the undamaged and the damaged bridges. The indication is again the sudden change of the period to a longer time as the indicator for the damage.

Figure 27:
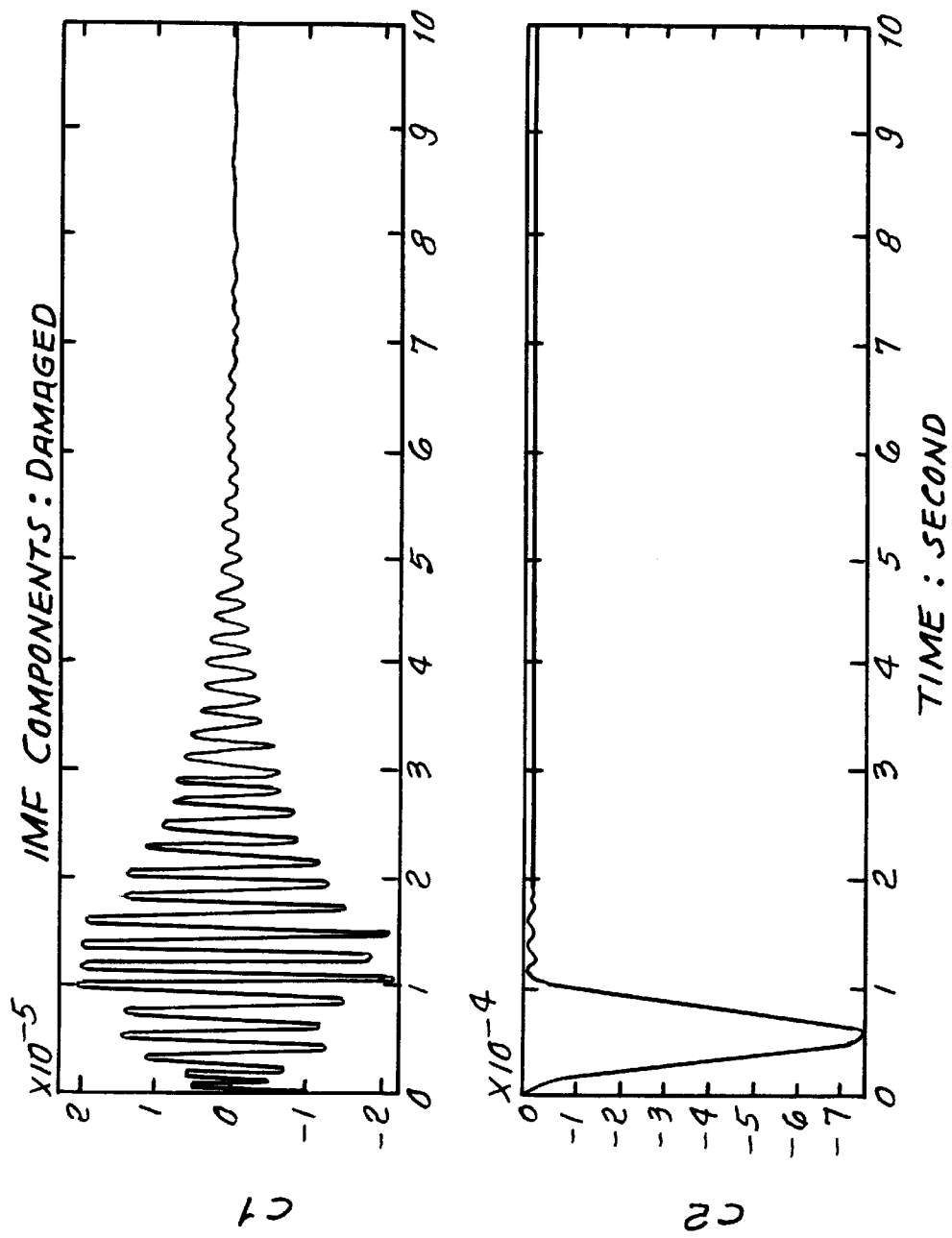
Figure 28:
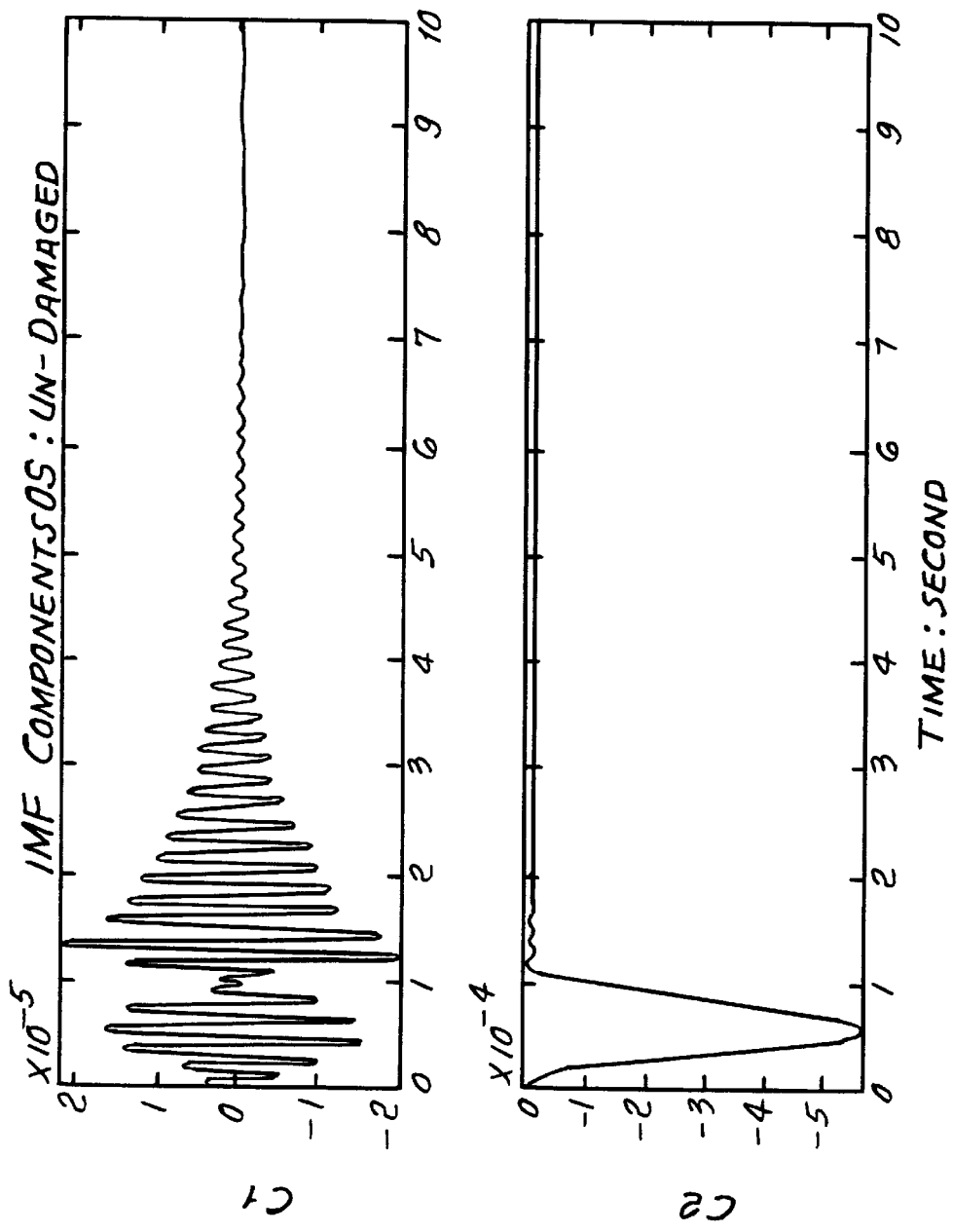
Figure 29:
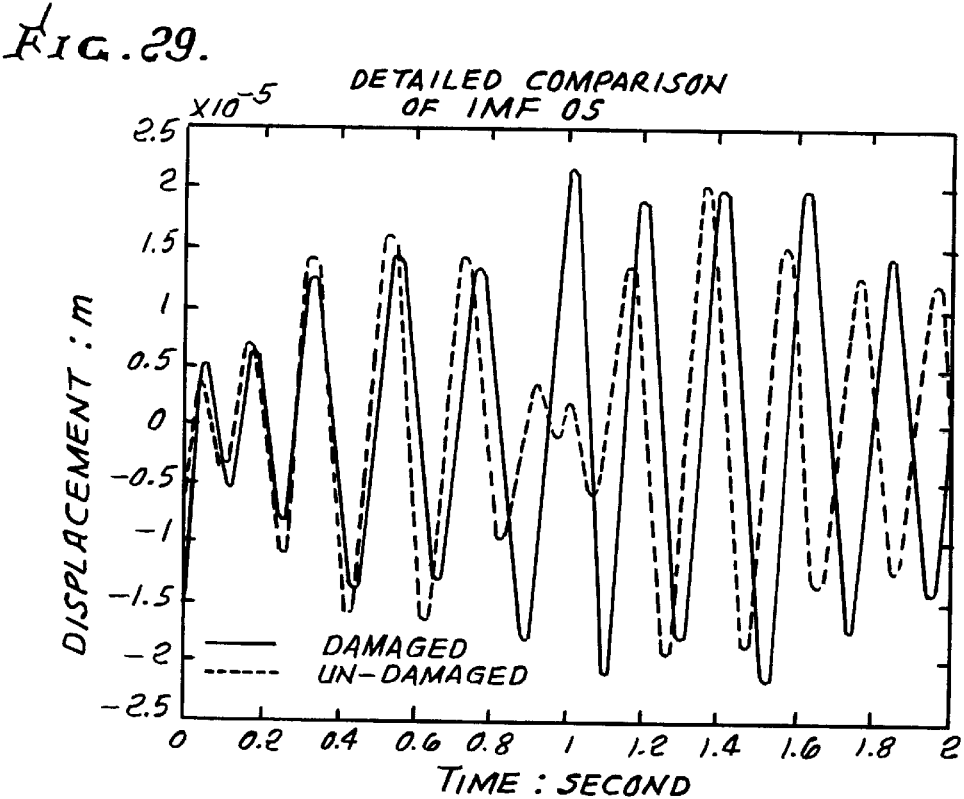
Figure 30:
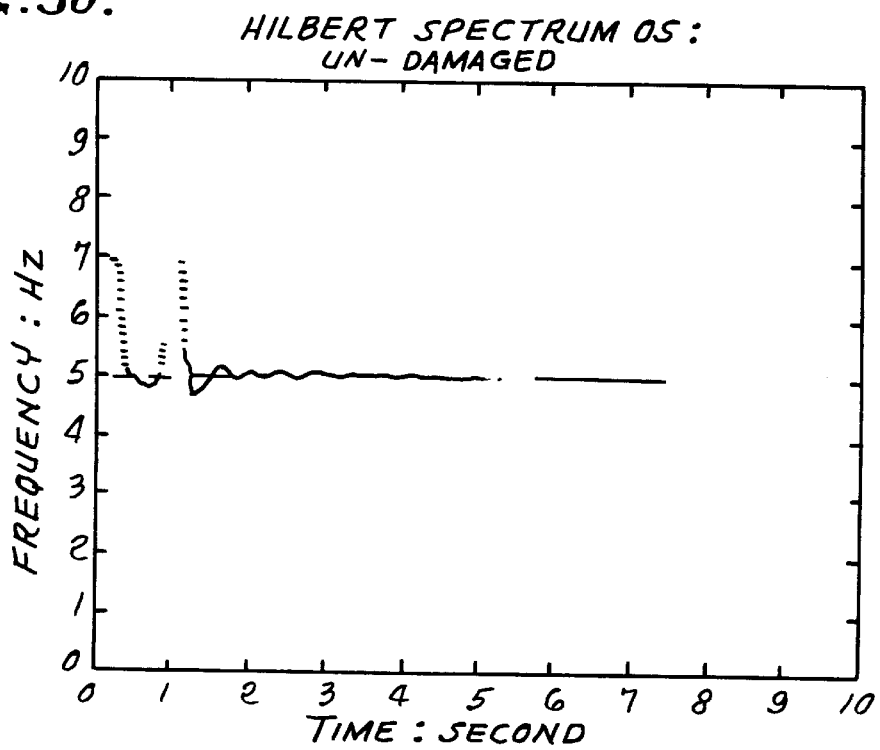
Figure 31:
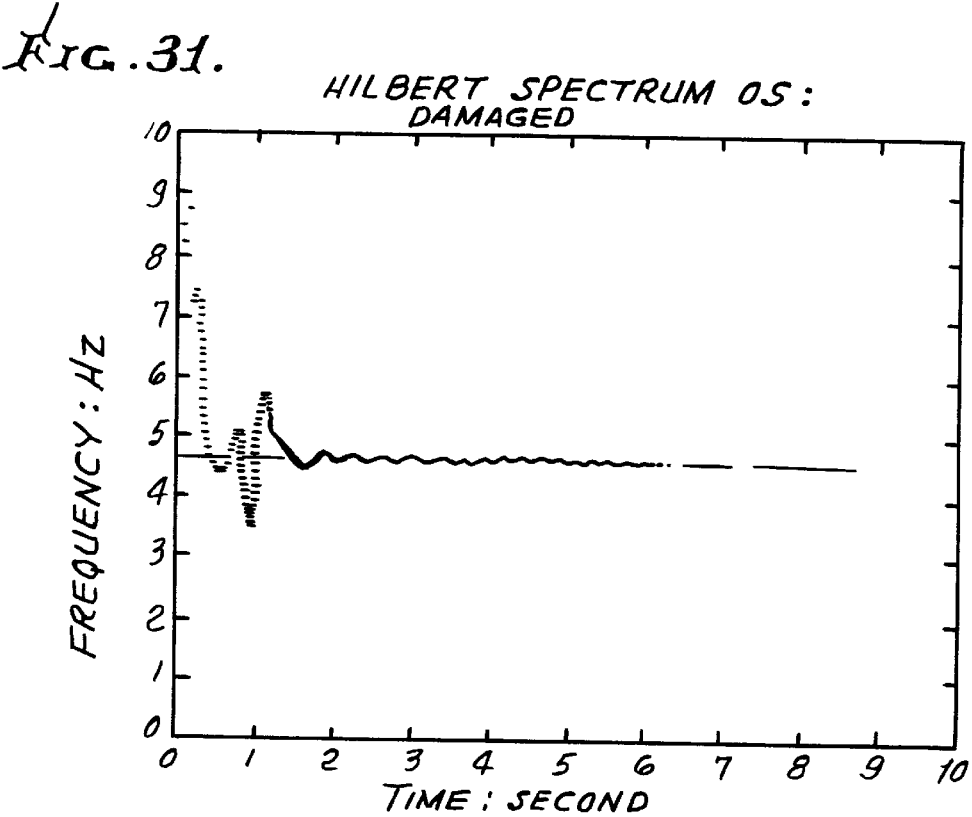
Figure 32:
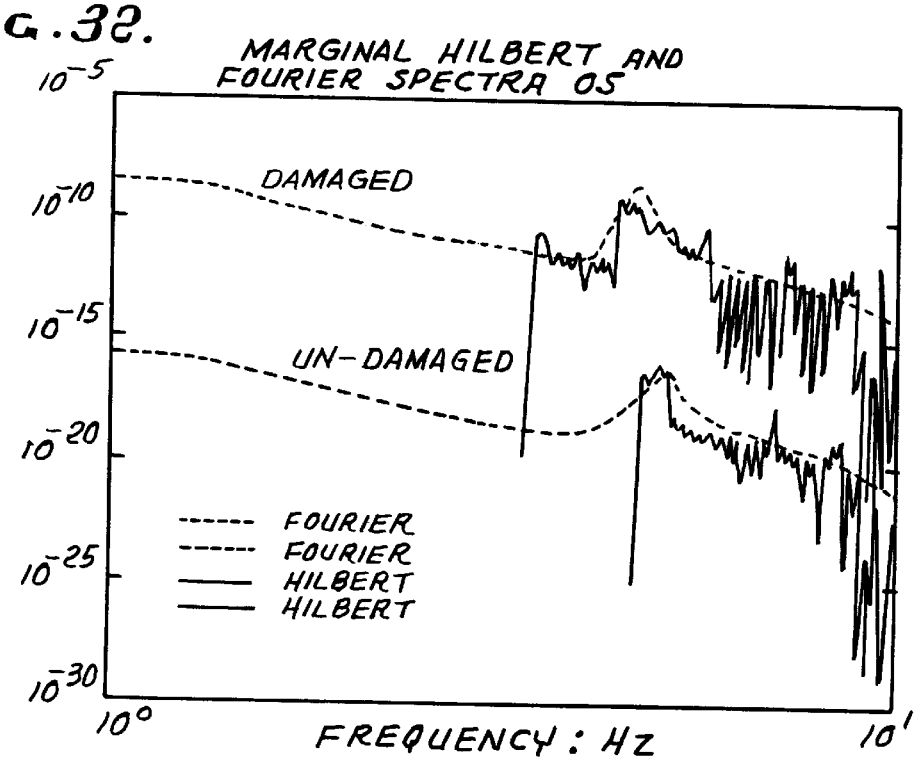

Implementation with dynamic deflection response only: In this approach, one can take only the dynamic response without the static deflection as a reference. One can perform the EMD analysis on the dynamic deflection data only. The results of the undamaged and damaged records are shown in FIGS. 27 and 28 with only the first IMF components separated from the rest of the data. The detailed comparison of the first components is given in FIG. 29. Clearly, the deviation between the two records started at around 4.66 seconds as computed in Eq. (5). The Hilbert spectra of the energy containing IMF components from the records are shown in FIGS. 30 and 31. The down shift of the frequency again showed up in the damaged case. The marginal Hilbert and Fourier spectra are shown in FIG. 32, in which the clear peak in the undamaged case is changed to a much wider spectral band due to the nonlinear effects.

As these alternative implementation plans show, the essential features of the present approach is to use the variations of local frequency and deformation rather than the global frequency or deformation.

8. Sensitivity of the Method

Figure 33:
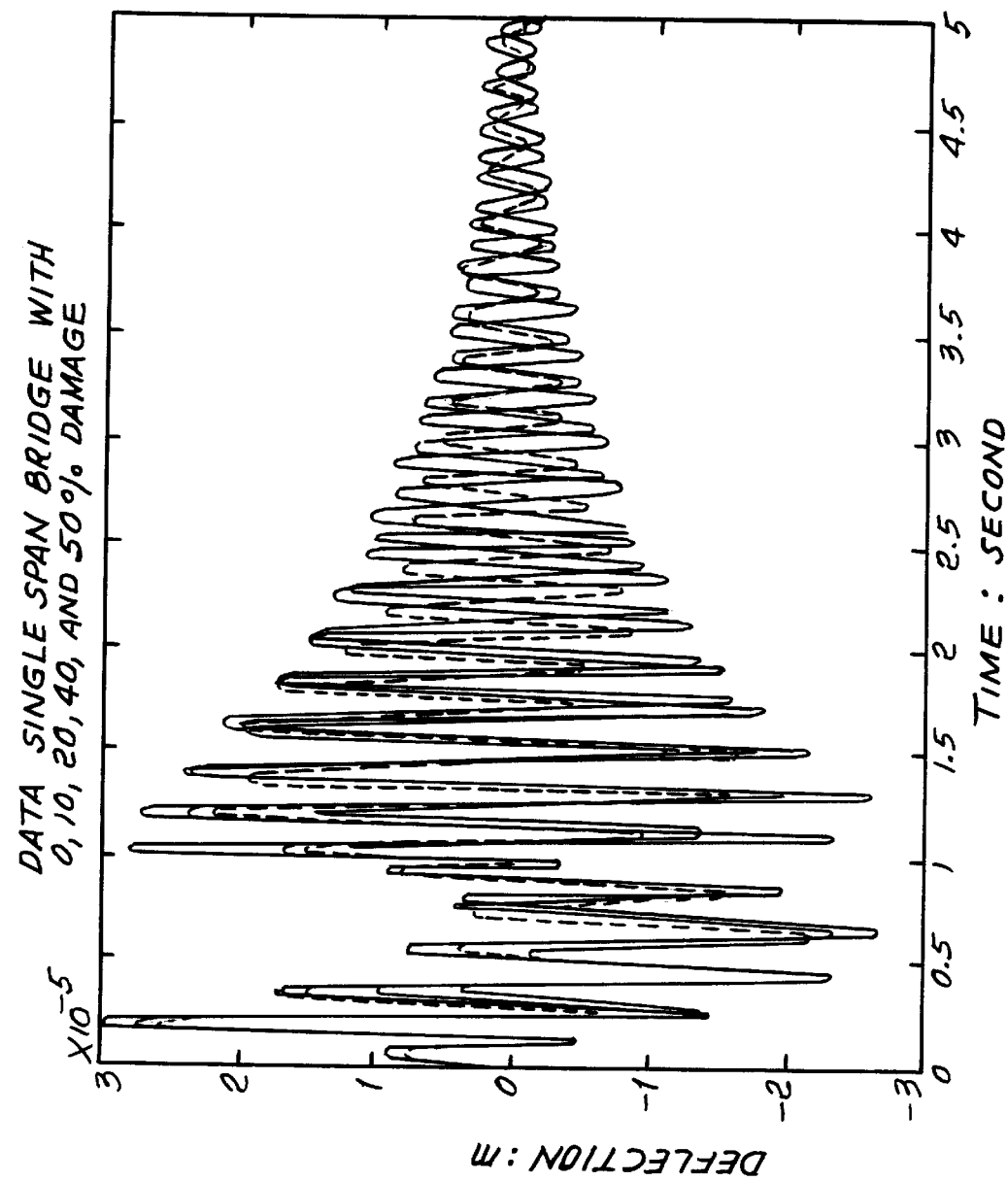
Figure 34:
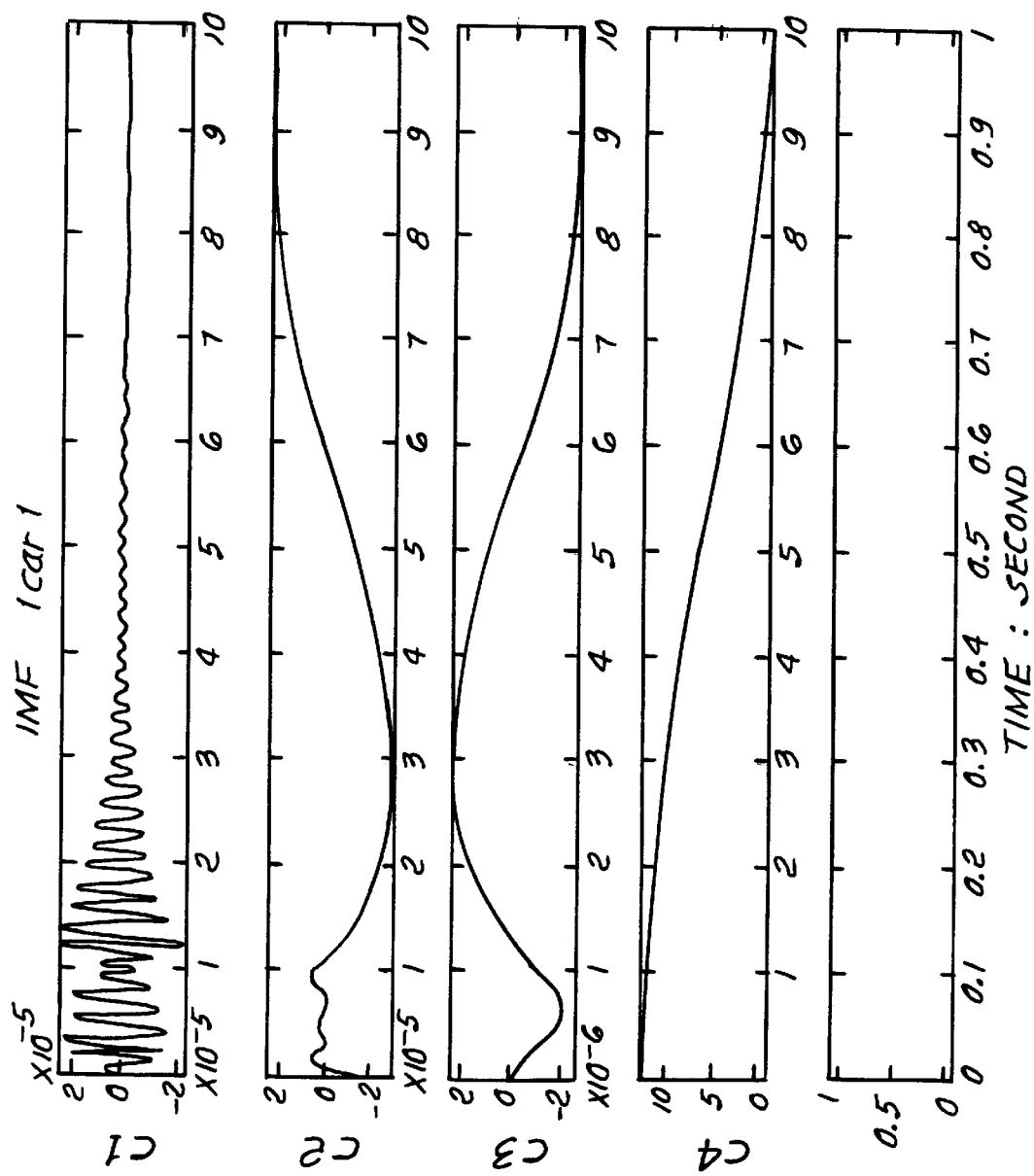
Figure 35:
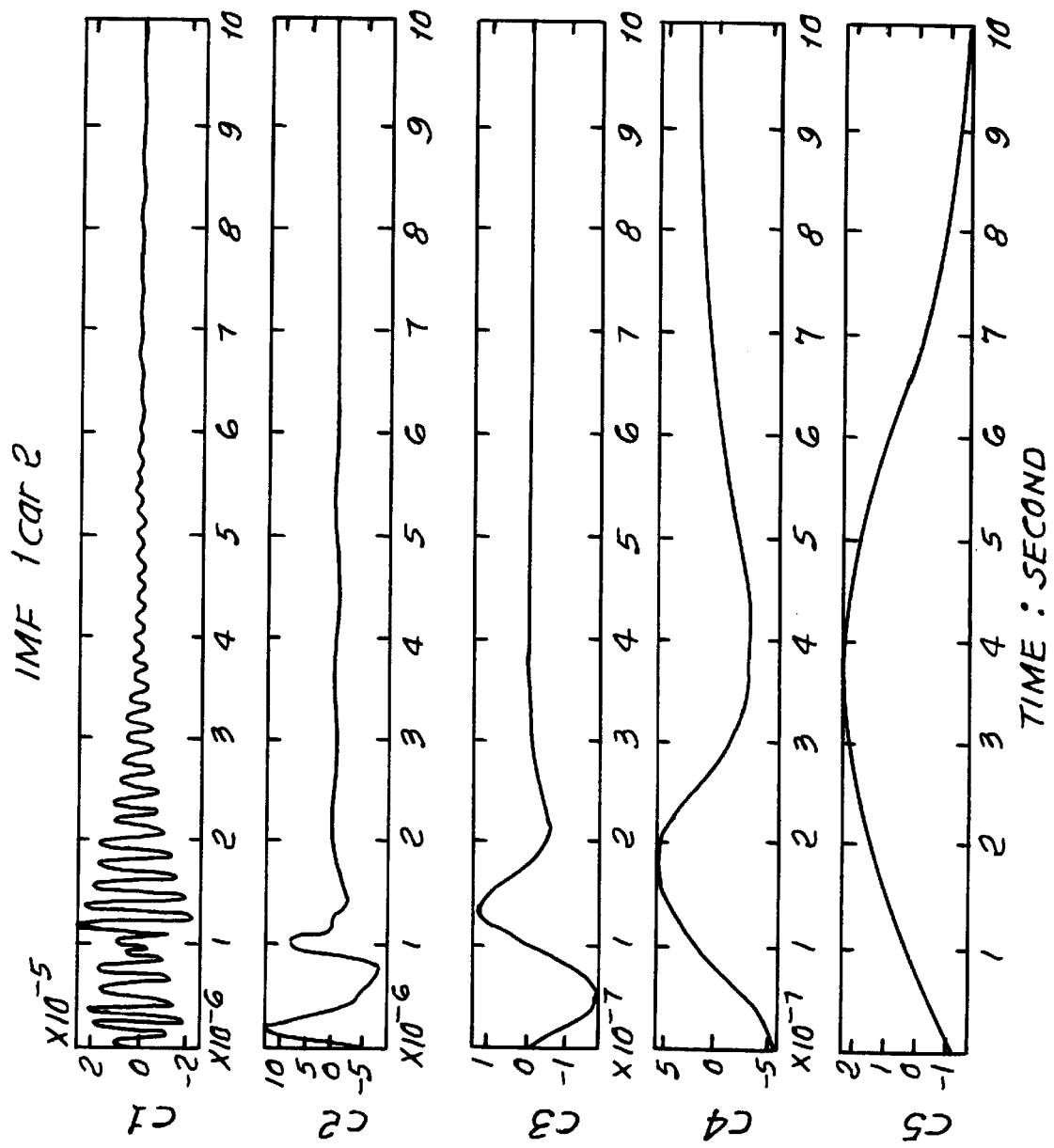
Figure 36:
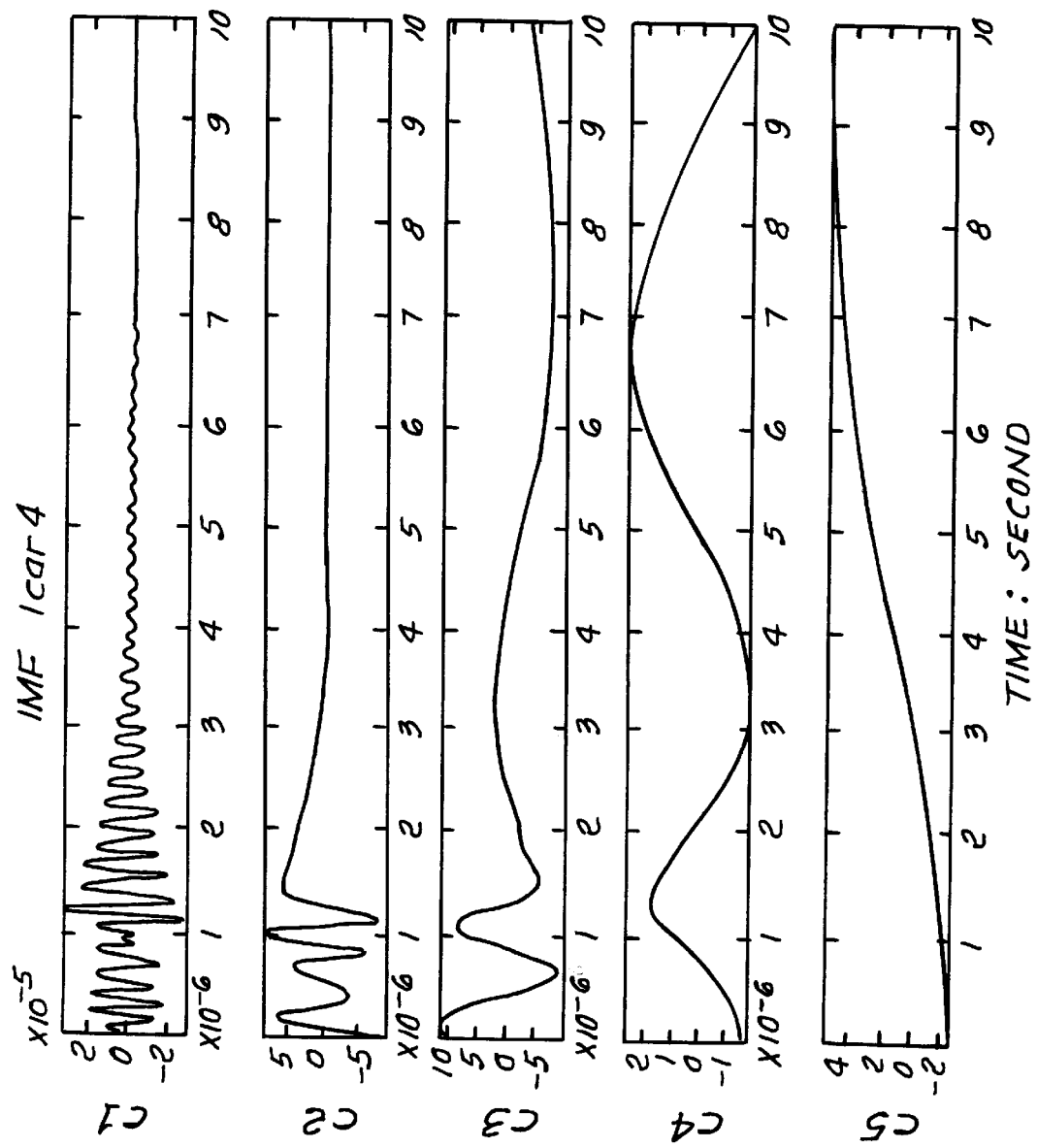
Figure 37:
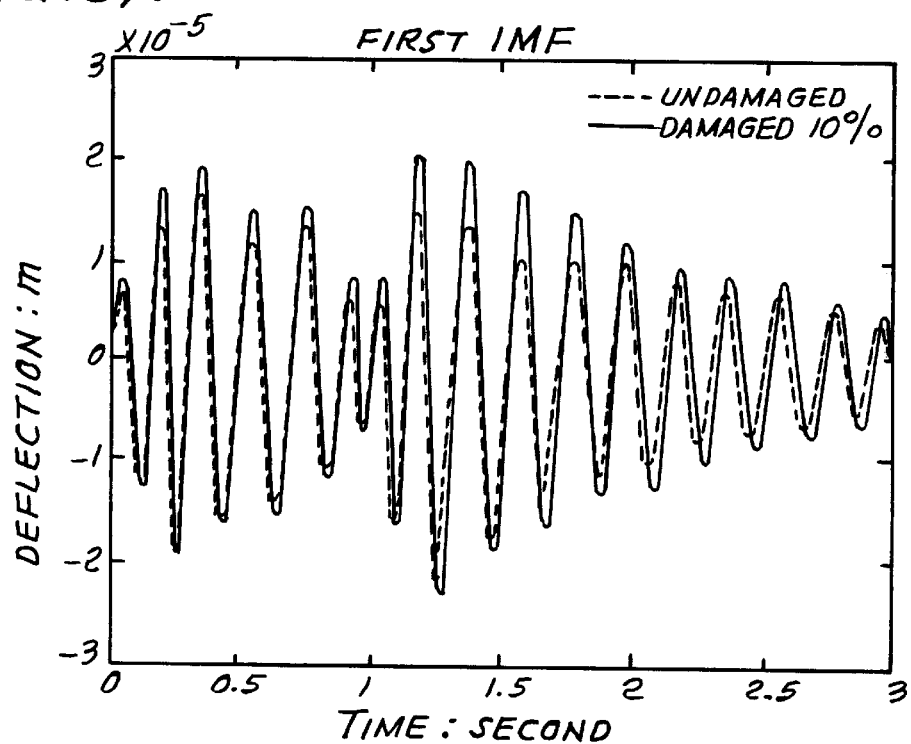
Figure 38:
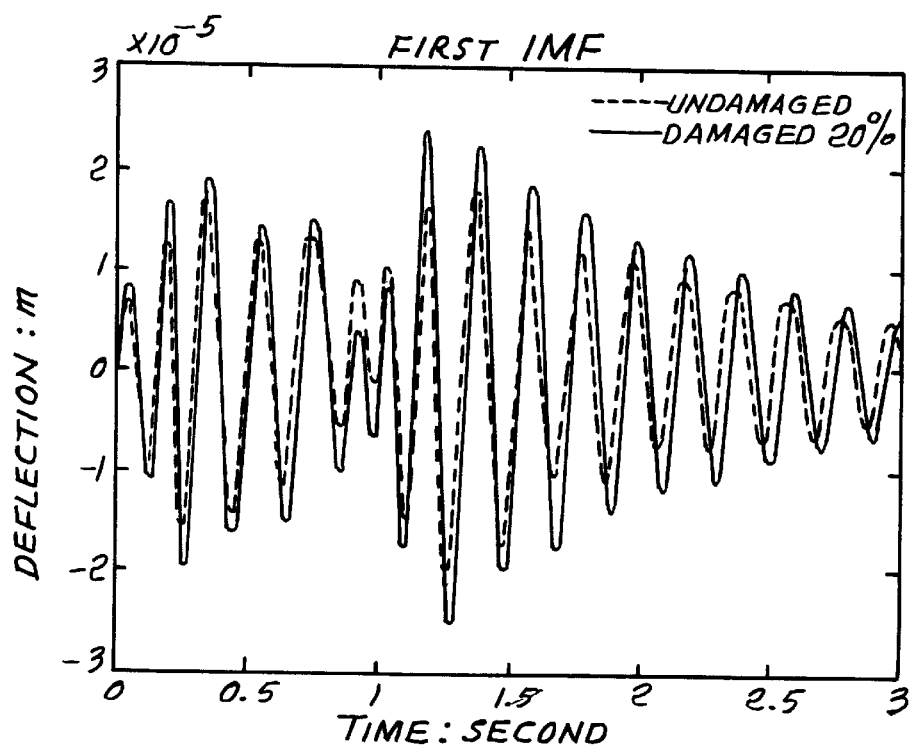
Figure 39:
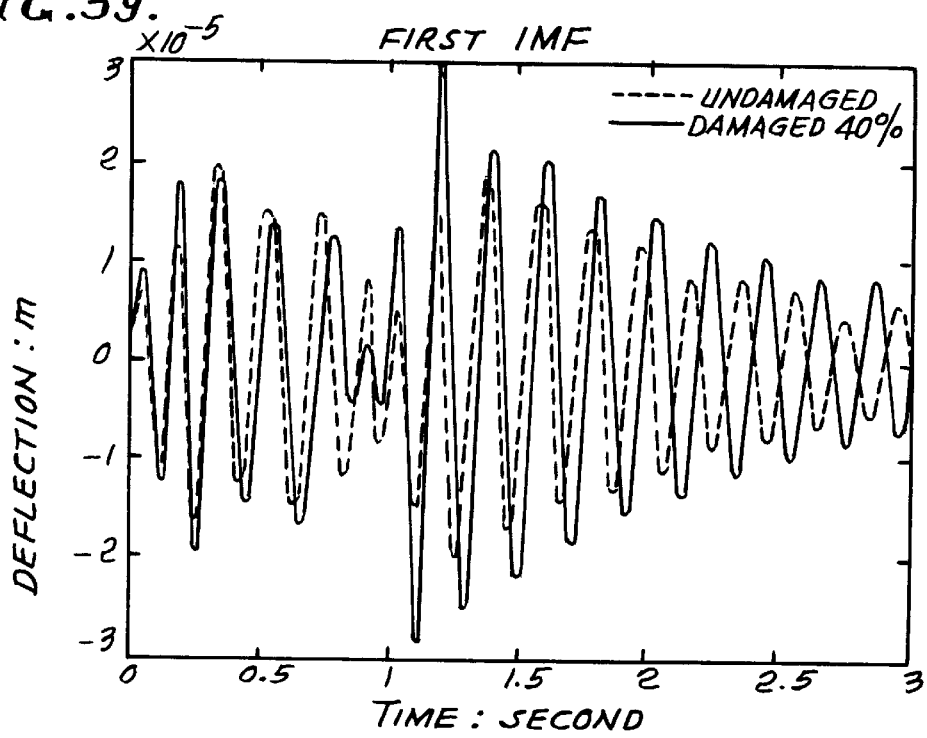
Figure 40:
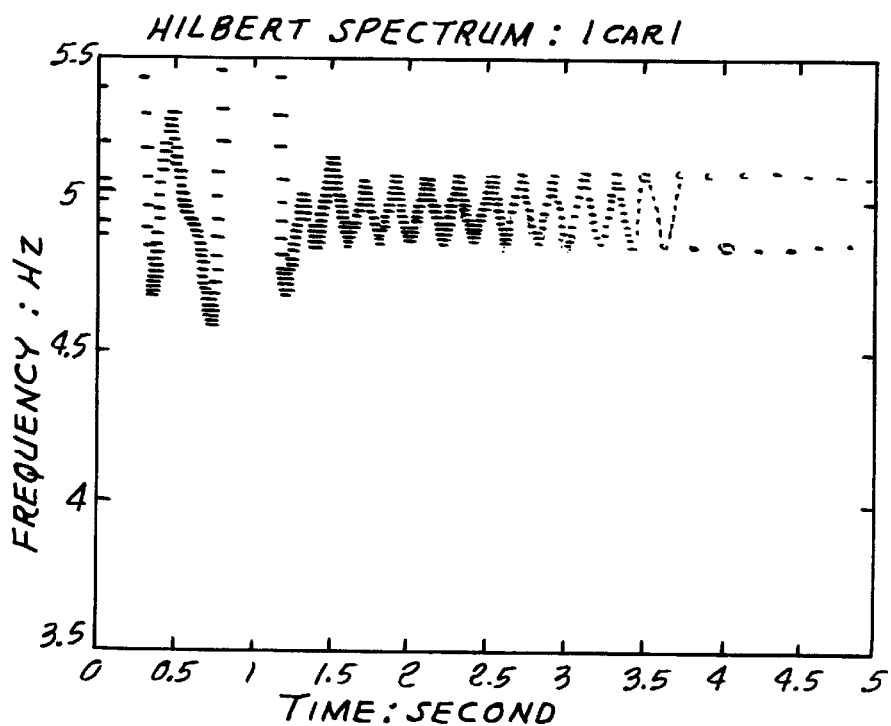
Figure 41:
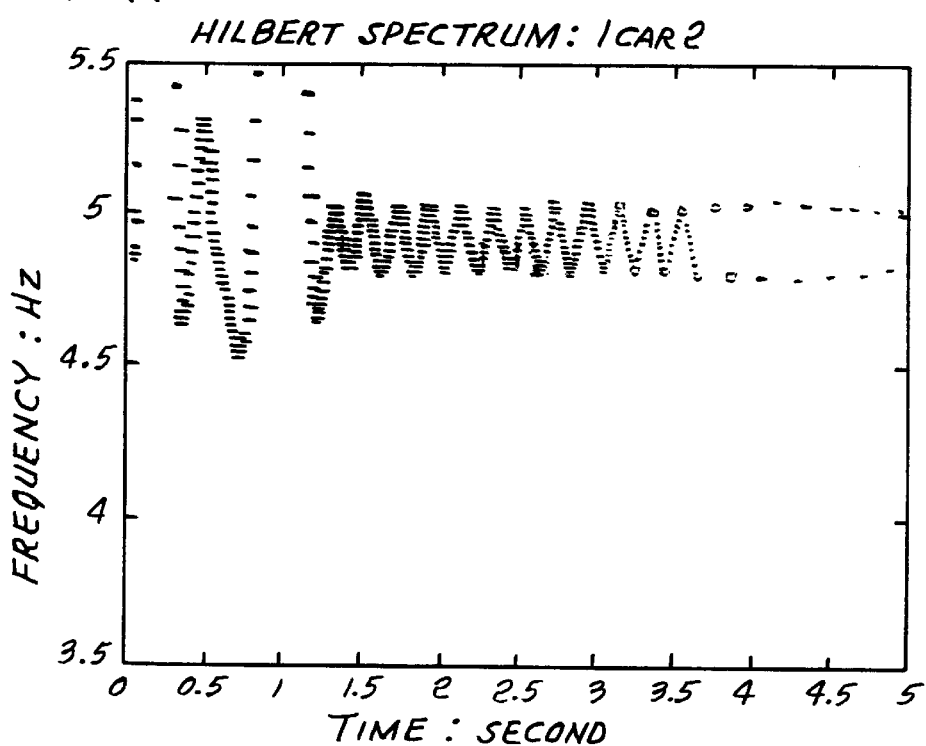
Figure 42:
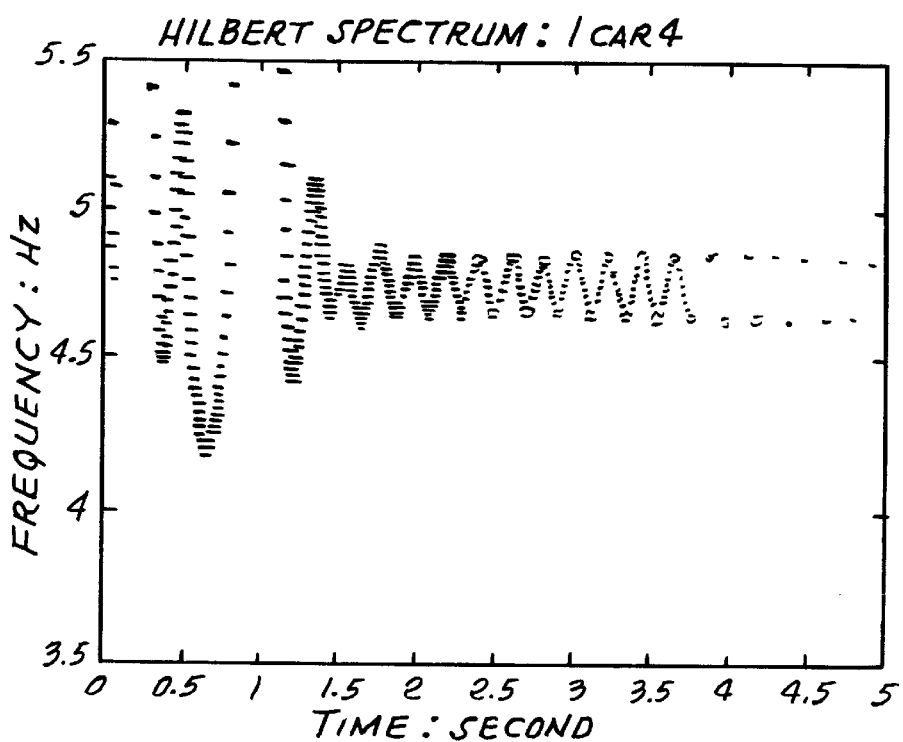

To test the sensitivity of the NIBSIS approach, the identical computer program was used to compute the response of the bridge for the identical loading condition, but with different degrees of damage. FIG. 33 gives the overall difference between the dynamic and static deflection for 10, 20, and 40% damage. FIGS. 37 through 39 give the comparisons of the first IMF component between the damaged ones and the undamaged bridge. The change of the period is obvious from these figures. FIGS. 40 through 42 give the Hilbert Spectra for all the cases studied. From these result, the mean free frequency, and the minimum forced frequency values can be measured. The results are shown in FIGS. 43 through 46.

FIG. 43 gives the free frequency measured as the mean value of the data length, and FIG. 44 gives the normalized free frequency with respect to the undamaged bridge. As the figure shows, the frequency decreases gradually with the degree of damage. For a 50% damaged cross section, the frequency decreased for about 8%, a figure comparable to that obtained by Prime and Shevitz (1996). FIG. 45 gives the forced frequency measured at the first low value of the forced vibration, and FIG. 46 gives the normalized forced frequency with respect to the undamaged bridge. The percent of decrease of the forced frequency is at around 11%, slightly higher than the free frequency. This increased frequency variation for the forced frequency is due to the nonlinear deflection.

The sensitivity of the present method is comparable to the best of the available methods for damage detection. The detection is arrived from the frequency variation of both the free and the forced waves. Independently, the detection can also be achieved through the difference between the forced and free oscillation, thus eliminating the need of the frequency of the reference state.

It is well known that the bridges or buildings are built with at least a safety factor of 2; therefore, even with a 50% reduction of the cross-section, the bridge is still safe for the design load. The result obtained here can clearly identify the damage without reference to the undamaged state when the damage reaches 40%. With the undamaged structure as a reference, damage as low as 10 to 20% can be detected.

9. Strategy for Sensor Deployment

The sensors of choice for NIBSIS are displacement gauges and accelerometers. The best sensor for measuring displacement is the coherent laser radar. It is capable of sub-millimeter accuracy. The modern version can make simultaneous measurements at more than a dozen of points. The best accelerometer is the Force Balance Accelerometer. Even the standard version can have a measurement range of +0.5 g with a sensitivity of 5V/g. The dynamic range is 130 dB from 0 to 50 Hz with a resolution of 1 $\mu$g.

In all the above examples, the sensors are all placed at the middle span. This location is optimal for the sensors will record the maximum displacement and acceleration values. This is certainly true if the damages are confined to the bridge deck structures. There are, however, cases when the damages are in the piers or abutments. Then, the sensors should also be placed near the bridge supports. Such locations are also sensitive to shear stress and strain. Therefore, the full deployment for a bridge should be at least three sensors: one at mid-span, and two at the ends. This number of sensors is much lower than those required for the modal analysis, in which the sensors have to be deployed so dense that the deformation of the whole bridge be defined precisely for the various mode determinations.

10. Summary of the NIBSIS System and Claims

Based on the above discussion, a new Nondestructive Instrument Bridge Safety Inspection System (NIBSIS) Using a Transient Load presented is schematically shown in FIG. 47. Basically the NIBSIS System consists of the following components:

Sensors 30: strain gauge or laser for sensing deflection of bridge 31 spans, or accelerometers for sensing acceleration.

A-to-D Converter: to generate the digital data

Central Processor: specialized computer with HHT algorithm and other damage detection criteria resting routines Monitor: to display the results.

See also testing of a building 40, tower 41, or dam 42.

Figure 48A:
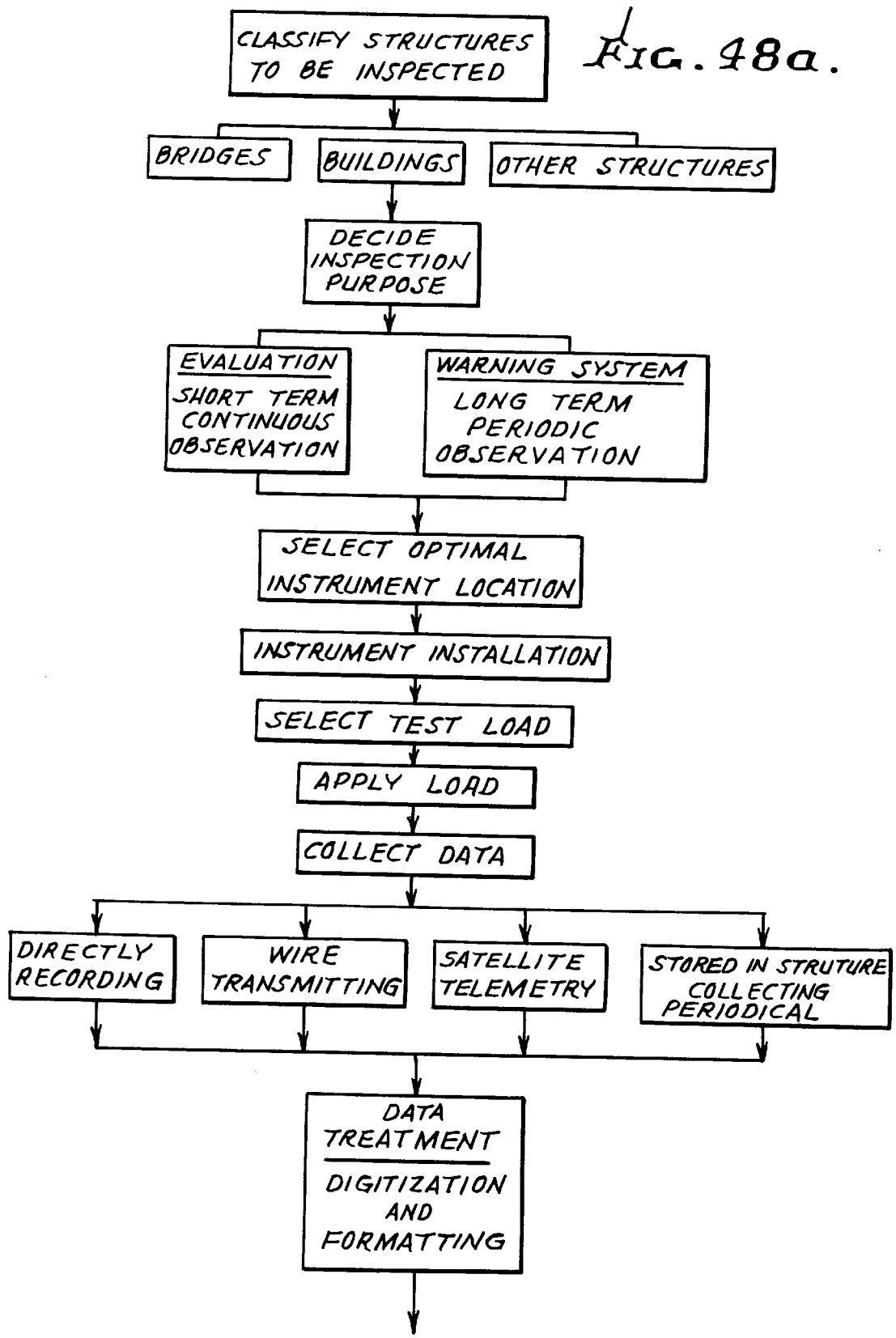
FIGS. 48a and 48b are diagrams showing testing procedure.
Figure 48B:
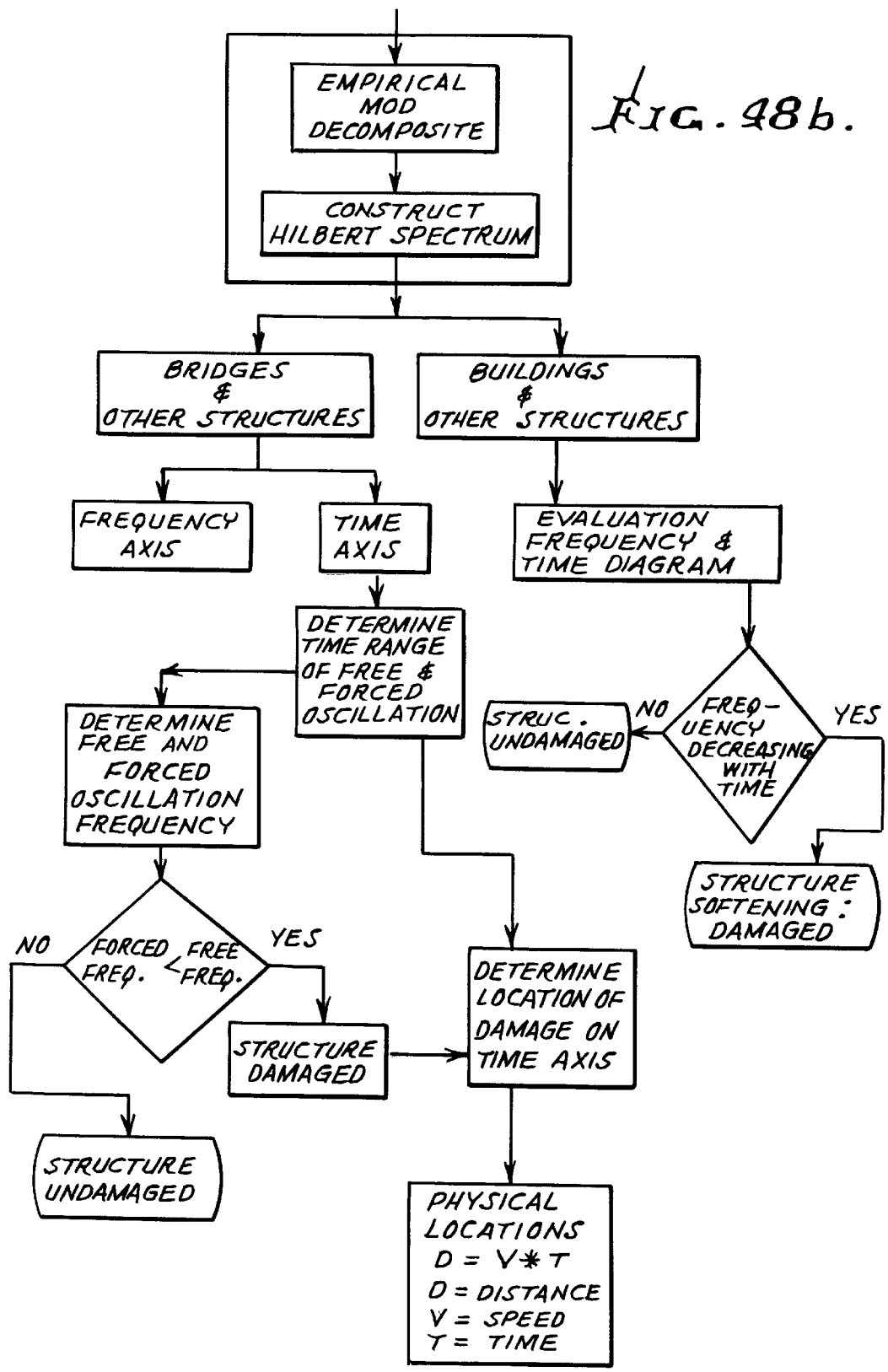

The data flow in the NIBSIS can be summarized in FIGS. 48a and 48b.

The invention results in the following advantages:
1. that HHT approach can detect bridge damage,
2. that HHT approach can determine the location of the damage,
3. that HHT approach can estimate the degree of the damage,
4. that HHT approach can be applied to other structures as in a building, and
5. that HHT approach can be applied in detection of damages in mechanical systems.

Advantage one is based on the nonlinear behavior of the bridge. A damaged bridge will suffer large deformation so much so that the response would be in the nonlinear range. The indication of the nonlinear characteristics is on the Hilbert spectrum indicated by the intra-wave frequency modulation when the test load is in the mid-span.

Advantage two is based on the temporal location of the abnormal frequency downshift in the Hilbert spectrum. The damage location should be at the point when the frequency of the forced vibration falls below the frequency of the free vibration.

Advantage three is based on the absolute change of the free vibration frequency after the passage of the test load, which is related to the moment of inertia of the bridge cross section according to the formula given above.

Advantage four is based on theoretical consideration. Any structure should have a proper frequency. This frequency will change with the stiffness change. As long as the structure will have a dynamic response, the vibration characteristics will reveal the variation of the frequency due to damage. The loading condition is the simplest in the near one dimensional structure such as a bridge. Other loading for other more complicated structures will depend on the normal use and other test considerations.

Advantage five is based on the similarity between the vibration characteristic change due to damage in the mechanical systems as in the bridges. Existing difficulties can be eliminated to a large degree by the application of the HHT method.

In practice, most structures are designed and built with generous safety factors. Minor damage, therefore, would not give detectable signals. Such damage would also have insignificant consequence. Any detectable signals, therefore, are serious ones.

11. Further Advantages of the Present Method

The present method is based on the transient load, and the most effective detection method, the HHT. It requires no special force generating machines. The only requirement is the traffic condition be controlled for as long as the test load traveling at the normal traffic speed passed the bridge. This controlled traffic condition, however, is not difficult to achieve; it only requires that, during the period of the transient time of the test load, no other traffic be allowed on the bridge. This will cause little to no traffic disruption. The test load can be a fully loaded truck, or a roller, which is even better, for the load will be even more concentrated.

The data analysis method is the most unique and at the forefront of the research in the data analysis. It utilizes not only the nonlinear characteristic of the response to determine the damage, but also the transient properties of the load to determine the damage location. Then, the free vibration frequency can be used to determine the extent of the damage.

Considering the low number of the sensors required, and the efficient way of utilizing the data, HHT is by far the best available.

12. Conclusion

Based on the above discussions, a new method is provided using a transient test load to detect the location as well as the extent of bridge damage.

The bridge inspection method as described has potential to predict the remaining safety life of a bridge based on computation of the change of the free oscillation frequency related to the original design values. Such knowledge can ensure the emergency response operation of the bridge crisis situation such as during an earthquake or a major storm.

This method can also be extended to the inspection of other structures such as existing buildings and also to mechanical systems. Although the many other structures may be more complicated, the basic principle involved is identical to the bridge inspections.

In summary, the invention provides the following:
1. The moving load approach will offer a truly objective and accurate bridge inspection method.
2. The HHT enables us to analyze the nonlinear response from a transient test load to any bridge, and use the transient load as the optimal test load.
3. The transient load can be regarded as a continuous impulse load that will be applied to every point of the bridge, and the level of the loading can be adjusted to fit the design load which will reveal the response of the bridge under finite deflections.
4. The transient load will reveal not only the change of the proper frequency due to damages but also pinpoint the damage locations.
5. The nonlinear intra-wave frequency variation and the extent of the forced frequency down shift can reveal the extent of nonlinearity in the response. With proper calibration, can provide means to estimate the future service limit.
6. This instrument inspection method can be carried with minimum interruptions.

The following three(3) non-provisional patent applications are incorporated herein by reference, as to their disclosures:

Pitrent Application 1
Title: "Computer Implemented Empirical Mode Decomposition Method, Apparatus, and Article of Manufacture", filed Jun. 10, 1997, application Ser. No. 08/872,586, inventor: Norden E. Huang.

Patent Application 2
Title: "Computer Implemented Empirical Mode Decomposition Method, Apparatus, and Article of Manufacture Utilizing Curvature Extrema", filed May 21, 1998, application Ser. No. 09/082,523, inventors: Norden E. Huang and Zheng Shen Patent Application 3
Title: "Computer Implemented Empirical Mode Decomposition Method, Apparatus, and Article of Manufacture for Two-Dimensional Signals", filed Sep. 10, 1998, application serial number yet to be received , inventor: Norden E. Huang

I claim:

1. The method of determining the location of structure damage to a bridge structure, the steps that include:
   a) providing a single transient load imposing device, said device being one of the following:
      i) a truck
      ii) a roller
   b) traveling said device onto the bridge and then along the bridge,
   c) detecting bridge vibrating response including changes in bridge vibrating frequency during said traveling,
   d) and determining the position of said device in relation to a shift of said frequency below a selected value, said shift of said frequency below a selected value being a downshift in the Hilbert spectrum.

2. The method of claim 1 wherein said detecting step includes locating a vibration sensor at a position on the bridge between opposite ends of the bridge.

3. The method of claim 1 wherein said detecting step includes locating a vibration sensor at a position approximately mid-way between opposite ends of the bridge.

4. The method of claim 1 wherein said device is provided in the form of a weight imposing wheel or wheels.

5. The method of claim 1 wherein said device is provided in the form of at least two weight imposing wheels spaced apart in the direction of bridge elongation.

6. The method of claim 1 said steps a), b) and c) are carried out first for an undamaged bridge and then steps a), b) and c) are carried out later for the same bridge after which is damaged.

7. The method of claim 1 including determining the elapsed time taken for travel of the traveling load on the bridge to the point where said shifting of frequency occurred.

8. In the method of determining the location of structure damage to a building structure, the steps that includes:
   a) providing a single transient load imposing device, said device being one of the following:
      i) a truck
      ii) a roller
   b) traveling said device onto the building and then along the building.
   c) detecting building vibrating response including changes in building vibrating frequency during said traveling.
   d) and determining the position of said device in relation to a shift of Raid frequency below a selected value, said selected value being the building free oscillation frequency after the load imposing device has passed over the building.

* * * * *